US 9,779,479 B1

(12) United States Patent
Makinen et al.

(10) Patent No.: US 9,779,479 B1
(45) Date of Patent: Oct. 3, 2017

(54) VIRTUAL REALITY STREAMING

(71) Applicant: Umbra Software Oy, Helsinki (FI)

(72) Inventors: Otso Makinen, Helsinki (FI); Antti Hatala, Helsinki (FI); Hannu Saransaari, Helsinki (FI); Jarno Muurimaki, Helsinki (FI); Jasin Bushnaief, Helsinki (FI); Johann Muszynski, Helsinki (FI); Mikko Pulkki, Helsinki (FI); Niilo Jaba, Helsinki (FI); Otto Laulajainen, Espoo (FI); Turkka Aijala, Helsinki (FI); Vinh Truong, Espoo (FI)

(73) Assignee: UMBRA SOFTWARE OY, Helsinki (FI)

( * ) Notice: Subject to any disclaimer, the term of this patent is extended or adjusted under 35 U.S.C. 154(b) by 0 days.

(21) Appl. No.: 15/415,158

(22) Filed: Jan. 25, 2017

Related U.S. Application Data

(60) Provisional application No. 62/315,866, filed on Mar. 31, 2016, provisional application No. 62/316,180, (Continued)

(51) Int. Cl.
*G06T 15/50* (2011.01)
*G06T 17/00* (2006.01)
(Continued)

(52) U.S. Cl.
CPC ............ *G06T 3/4092* (2013.01); *G06T 15/50* (2013.01); *G06T 17/00* (2013.01); *G06T 19/20* (2013.01);
(Continued)

(58) Field of Classification Search
None
See application file for complete search history.

(56) References Cited

U.S. PATENT DOCUMENTS

| 8,988,431 B2 | 3/2015 | Makinen et al. |
| 9,245,064 B2 | 1/2016 | Loberg |
| (Continued) | | |

FOREIGN PATENT DOCUMENTS

WO 2014/159285 A1 10/2014

OTHER PUBLICATIONS

International Search Report and Written Opinion issued in Application No. PCT/FI2017/050035, dated Jun. 30, 2017, 14 pages.

*Primary Examiner* — Mark Zimmerman
*Assistant Examiner* — Yu-Jang Tswei
(74) *Attorney, Agent, or Firm* — Young & Thompson

(57) ABSTRACT

A cloud network server system, a method, and a software program product for experiencing a three-dimensional (3D) model are provided. 3D model data associated with a 3D video game is uploaded to the cloud network server system. The system is used to design for example a computer game that renders non-spatial characteristics such as, smell, reflection and/or refraction of light, wind direction, sound reflection, etc., along with spatial and visibility information associated with 3D objects displayed in the 3D video game. Different versions of the 3D model are created based on memory, streaming bandwidth, and/or processing power requirements of different user terminal computers. Based on a virtual location of a user in the 3D model, parts of at least one version of the 3D model are rendered to the user.

30 Claims, 18 Drawing Sheets

Related U.S. Application Data filed on Mar. 31, 2016, provisional application No. 62/351,119, filed on Jun. 16, 2016.

(51) Int. Cl.
*G06T 19/00* (2011.01)
*G09G 5/00* (2006.01)
*G06T 15/08* (2011.01)
*G06T 3/40* (2006.01)
*G06T 19/20* (2011.01)

(52) U.S. Cl.
CPC .............. *G09G 5/006* (2013.01); *G06T 15/08* (2013.01); *G06T 19/006* (2013.01); *G06T 2200/04* (2013.01); *G06T 2200/16* (2013.01); *G09G 2370/022* (2013.01); *G09G 2370/16* (2013.01)

(56) References Cited

U.S. PATENT DOCUMENTS

| | | | |
|---|---|---|---|
| 9,583,140 B1* | 2/2017 | Rady | G11B 27/031 |
| 2002/0010734 A1* | 1/2002 | Ebersole | H04L 29/06 |
| | | | 709/201 |
| 2002/0190995 A1* | 12/2002 | Lim | G06T 15/40 |
| | | | 345/581 |
| 2007/0252841 A1 | 11/2007 | Kim | |
| 2009/0051681 A1 | 2/2009 | Sharp et al. | |
| 2011/0221865 A1 | 9/2011 | Hyndman | |
| 2013/0141428 A1 | 6/2013 | Gipson | |
| 2013/0203496 A1 | 8/2013 | Kruglick | |
| 2014/0002351 A1 | 1/2014 | Nakayama | |
| 2015/0258438 A1 | 9/2015 | Tait et al. | |
| 2015/0262421 A1* | 9/2015 | Bell | G06T 17/20 |
| | | | 345/423 |

\* cited by examiner

VIRTUAL REALITY STREAMING

TECHNICAL FIELD

Present disclosure generally relates to three-dimensional (3D) modelling and rendering, and more particularly for generating 3D models of objects, for improving virtual reality experience of a user.

BACKGROUND

Three-dimensional (3D) graphic models have wide variety of applications in a field of virtual reality, augmented reality, gaming, robotics, education, military, etc. 3D modelling comprises performing surface reconstruction where interactions between objects are reconstructed to create a 3D model.

Typically, 3D modeling comprises processing large data sets corresponding to object geometries to compose lifelike 3D models in real time. Such 3D modelling requires large storage space in the computing environment, and makes the process computationally expensive and time consuming. Rendering of the 3D models when done in real-time requires a large memory footprint, as a large number of geometries need to be displayed in high-resolution, comprising detailed textures, and in appropriate lighting conditions. Advantageous run time performance of 3D modelling systems can be achieved by reducing memory usage required for the computation and the storage of the 3D models.

A graphics engine configured to build voxel cells and portal graphs associated with 3D graphics data is disclosed in U.S. Pat. No. 8,988,431. This document is cited here as reference. Rendering shading and light effects on 3D computer graphics was already known in Ren et al. WO 2014159285. This document is also cited here as reference.

How a web server in communication with an external design application and an external display application facilitates rendering, display, navigation, and/or sharing of computer generated designs and models is discussed in U.S. Pat. No. 9,245,064. This document is also cited here as reference.

However, the prior art is deficient in techniques that would integrate designing and display of 3D graphic models on a web server for providing a responsive and seamless virtual reality experience of 3D environments.

SUMMARY

It is an object of the invention to address and improve aforementioned deficiencies in above discussed prior art(s).

It is an object of the invention to provide a virtual reality experience of at least one three-dimensional (3D) model using spatial and non-spatial information via cloud servers. A cloud network server system comprising a model upload computer, a cloud server network, and a user terminal computer is provided for experiencing the at least one 3D graphical computer model.

In one aspect of the invention, 3D graphical computer model data (or model data) is uploaded to the cloud server network from the model upload computer. The model data comprises, for example, geometry information of objects.

In another aspect of the invention, the 3D graphical computer model is composed from the 3D graphical computer model data and is partitioned into smaller cells. The 3D graphic computer model is partitioned into voxel cells to create a voxel grid having portal graph. The portal graph displays portals separating the voxel cells from the object geometry for representing the 3D graphic computer model of the object.

In a further aspect of the invention, a user connects to the cloud network server system with the user terminal computer. The user terminal computer is installed with an application configured for viewing the 3D graphical computer model from the cloud server network. For example, the user may install the application on a smartphone to view the 3D graphical computer model received from the cloud server network.

In another aspect of the invention, only parts of the 3D graphical computer model visible from a virtual location are displayed based on a virtual location of the user within the 3D graphical computer model. For example, if the user is standing at an entrance of a building, the 3D model of the building displayed to the user is that of the entrance area of the building alone, instead of rendering a complete 3D model of the entire building.

In another aspect of the invention, multiple different versions of the 3D graphical computer model with different levels of detail are stored in the cloud server network. Parts of the 3D model are streamed to the terminal computer for display on the screen. The choice of the version of the 3D graphical model with the relevant detail level is based on the performance details of the terminal computer and the communication connection to the terminal computer.

In a further aspect of the invention, additional non-spatial information is included with spatial and visibility information of the 3D graphical computer model. The additional non-spatial information comprises, for example, reflectance and/or refraction attributes of light at a particular location in the 3D model, reflectance of sound at a particular location in the 3D model, smell, temperature, wind, quantity of natural light at a certain time and/or air speed, etc.

A method for experiencing a three-dimensional graphical computer model, comprises at least one distributed cloud network server system comprising a plurality of servers, at least one model upload computer and at least one user terminal computer, characterised in that,
- a three-dimensional graphical computer model data is uploaded to the cloud network from the at least one model upload computer,
- the three-dimensional graphical computer model is composed from the data and is partitioned into smaller cells,
- a user connects to the cloud network with a terminal computer installed with an application configured for viewing the three-dimensional graphical computer model from said cloud server network,
- based on the virtual location of the user within the three-dimensional graphical computer model, only the parts of the three-dimensional model visible from said virtual location are displayed on the terminal computer screen to the user,
- parts of the three-dimensional graphical computer model are streamed to the application on said terminal computer.

A software program product stored in a computer readable medium for providing a three-dimensional graphical computer model is executable in at least one distributed cloud network server system comprising a plurality of servers, at least one model upload computer and at least one user terminal computer, characterised in that,
- three-dimensional graphical computer model data is configured to be uploaded to the cloud network from the at least one model upload computer, the three-dimensional graphical computer model is configured to be composed from the data and is partitioned into smaller cells, a user connects to the cloud network with a terminal computer installed with an application configured for viewing the three-dimensional graphical computer model from said cloud server network, based on the virtual location of the user within the three-dimensional graphical computer model, only the parts of the three-dimensional model visible from said virtual location is configured to be displayed on the terminal computer screen to the user, parts of the three-dimensional graphical computer model are streamed to the application on said terminal computer.

A cloud server network system for providing a three-dimensional graphical computer comprising a plurality of servers, at least one model upload computer and at least one user terminal computer, characterised in that, three-dimensional graphical computer model data is configured to be uploaded to the cloud network from the at least one model upload computer, the three-dimensional graphical computer model is configured to be composed from the data and is partitioned into smaller cells, a user is configured to connect to the cloud network with a terminal computer installed with an application configured for viewing the three-dimensional graphical computer model from said cloud server network, based on the virtual location of the user within the three-dimensional graphical computer model, only the parts of the three-dimensional model visible from said virtual location are configured to be displayed on the terminal computer screen to the user, parts of the three-dimensional graphical computer model are streamed to the application on said terminal computer.

Non-spatial information and spatial information are understood in this application as follows. Spatial information is the co-ordinate information, i.e. location, of a physical object or empty space. Non-spatial information is the information about the attributes within the 3D space defined by the spatial information, such as smell, sound reflection, echo, light reflection and/or refraction, temperature and the like information. It is possible and in accordance with the invention to provide non-spatial information as a function of spatial information, e.g. temperature as a function of location.

The invention has sizable advantages. The invention results in a more detailed virtual reality experience of 3D representation of a variety of scenes comprising a variety of objects. Hence, the invention provides an improved user experience of 3D graphical computer models. By incorporating the non-spatial data, such as, smell, sound reflection, light reflection and/or refraction, etc., to the 3D model, the rendering of the 3D model provides a more seamless and interactive virtual reality experience to the user. Also importantly, the present disclosure provides a method of creating different versions of the 3D model for different configurations of computer terminals. The invention takes into consideration bandwidth requirements, processing power, and/or memory requirements of the computer terminals. This is helpful in ensuring small memory footprint for displaying the 3D models along with the non-spatial characteristics in different types of computer terminals. Since a memory requirement is substantially reduced, the rendering of the 3D models becomes more time efficient. The invention results in a more lifelike virtual reality experience.

The best mode of the invention is considered to be designing a 3D computer game that renders very efficiently to multiple devices of different capabilities, from the cloud server network. The cloud server network will contain a more detailed higher memory footprint version of the 3D graphical model of the computer game for e.g. high performance computers that have an optical communication connection, and a less detailed, lower memory footprint version for mobile devices with a wireless connection that has narrower bandwidth. In the best mode, there are 3D computer models and streaming routines that cater a broad range of client devices, which makes it possible that the cloud game is played with almost any device. In the best mode, the spatial and the non-spatial characteristics of the 3D video game are associated with a plurality of 3D objects displayed in the 3D video game. The non-spatial characteristics may comprise, for example, smell, reflection and/or refraction of light, wind direction, sound reflection, etc. The best mode of the invention makes it possible to render a detailed virtual reality gaming experience with substantially lesser time lag and lesser memory allocation requirement to terminal devices of different capabilities.

Some of the embodiments are described in the dependent claims.

DETAILED DESCRIPTION OF EMBODIMENTS

The present disclosure provides a method, a software program product, and at least one distributed cloud server network system for improving virtual reality experience of three-dimensional (3D) graphical computer models to a user. The 3D graphical computer models may be hereinafter referred to as "3D models".

The cloud server network system comprises a plurality of servers, at least one model upload computer, and at least one user terminal computer. The plurality of servers may collectively be known as a cloud server network. The cloud server network composes a 3D model from 3D model data obtained from the model upload computer. The cloud server network displays parts of the 3D model to a user based on a virtual location of the user in the 3D model. The 3D model is displayed along with additional non-spatial information, apart from conventional spatial information (or spatial information) and visibility information of the 3D model so displayed.

Figure 1A:
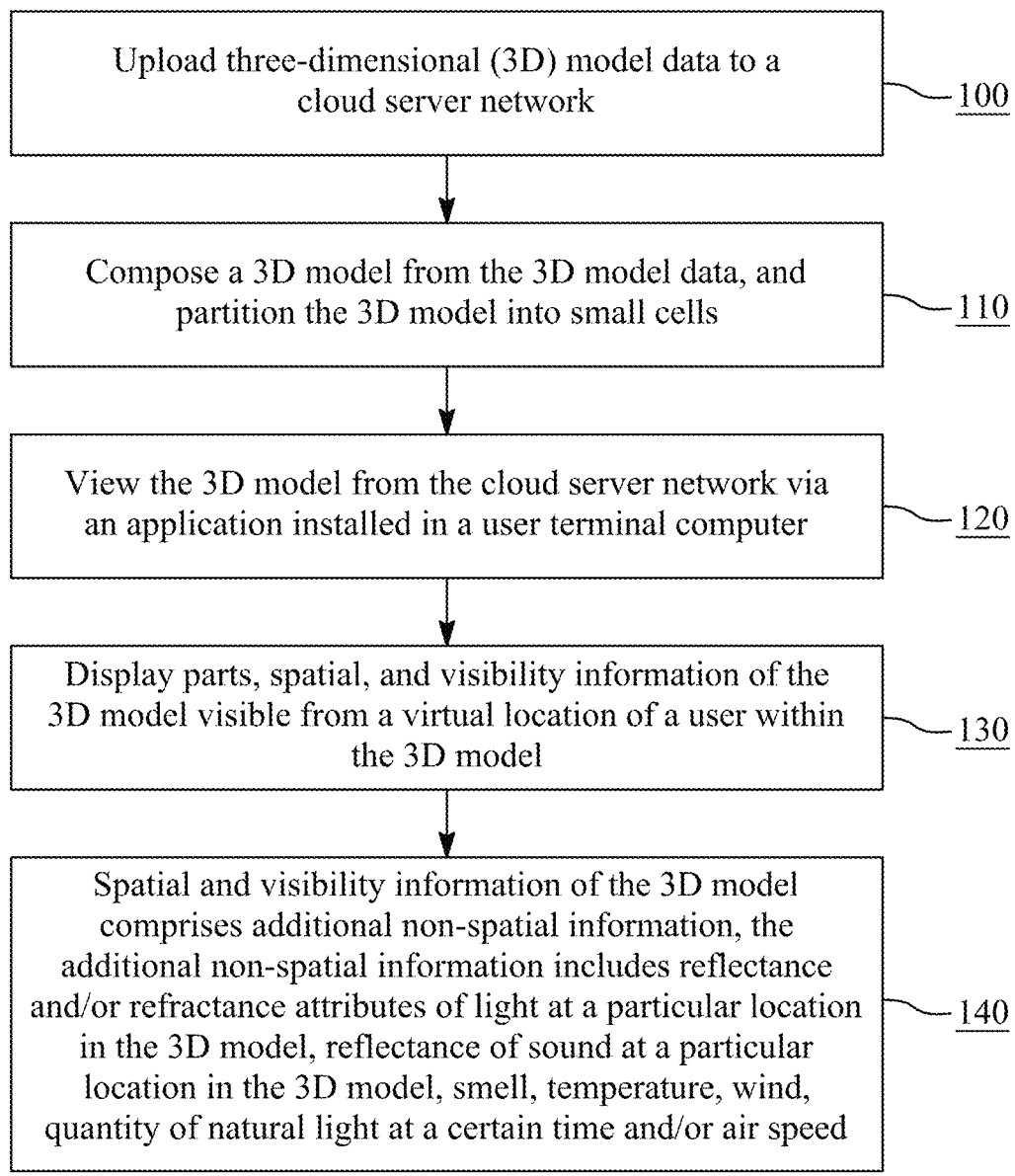
FIG. 1(A) demonstrates an embodiment 10 of a method for experiencing a three-dimensional (3D) model, in accordance with the invention as a flow diagram.

FIG. 1(A) demonstrates an embodiment 10 of a method for experiencing a 3D model, in accordance with the invention as a flow diagram. The method could be implemented in a system identical or similar to embodiment 30 in FIG. 3 for example, as discussed in the other parts of the description. An end-user of the method could use a user interface identical or similar to that disclosed with embodiments 20 and 50 in FIG. 2 and FIG. 5, respectively.

The method provides a lifelike virtual reality experience of 3D computer graphics to a user. The method for experiencing the 3D model inventively provides a distributed cloud server network system that generates the 3D model having non-spatial information. The 3D model is associated with a 3D scene displayed in the 3D model. The cloud server network system comprises the cloud server network, the model upload computer, the user terminal computer, and a communication network which is typically a cloud network.

In phase 100, the model upload computer uploads the 3D model data to the cloud server network. The 3D model data comprises, for example, geometry data, vertices, faces, parametric surfaces, scene data, appearance data, textures, physical properties, material properties, transformation data, camera information, light information, etc. The 3D model data may be uploaded in different 3D file formats, such as, 3DM (.3dm), 3DMF (.3dmf), 3DS (.3ds), 3DXML (.3dxml), AC (.ac), etc. The 3D model data may be stored either on the model upload computer or a cloud based database implemented in a cloud computing environment.

In phase 110, the 3D model is composed from the 3D model data. The 3D model is partitioned into small cells. The cells are voxel cells that are connected by portals. A voxel is a smallest unit of the 3D model data. A size of the voxel may be predetermined. In an example, a user may define the size of the voxel. In another example, the voxel size may be determined based on runtime processing and memory usage requirement. The portals may appear as doors or corridors in the 3D model. The 3D model is represented as a voxel grid with portal graphs. The voxelization of the 3D model is explained in detail in embodiments 70, 80, and 90 and is not repeated for the sake of brevity.

In phase 120, a user connects to the cloud server network with the user terminal computer. The user terminal computer is installed with an application configured to provide a user interface to the user for accessing the 3D model. Exemplary user interfaces in accordance with the invention are illustrated in the embodiments 20 and 50 of FIG. 2 and FIG. 5, respectively.

In phase 130, a virtual location of the user within the 3D model is determined. 3D model parts are displayed according to a location of the user. For example, 3D model parts that are visible from the virtual location of the user are displayed to the user. The displayed 3D model parts comprise spatial and visibility information corresponding to the 3D model parts. In one embodiment the virtual location of the user is given in the 3D model, from which the user can move with standard user interface controls that include but are not limited to mouse movements, keyboard or touch-screen commands/controls and the like. In some embodiment the virtual location of the user may be determined by using conventional gesture recognition techniques, facial recognition systems, facial motion capture techniques, eye tracking techniques, mouse tracking techniques, Facial Action Coding System (FACS), 3D immersive touch user interface, etc. In some embodiments the virtual location can be proportional to the real location, for example a person walking on a field could have virtual reality goggles on that would display an apartment or a gaming environment in a 1:1 or some other scale as the user walks the field, but sees himself in the virtual apartment or gaming environment in accordance with the invention.

In phase 140, additional non-spatial information is included with the spatial and the visibility information of the 3D model for providing an improved experience to the user. The additional non-spatial information comprises, for example, reflectance and/or refraction attributes of light at a particular location in the 3D model, reflectance of sound at a particular location in the 3D model, smell, temperature, wind, quantity of natural light at a certain time, and/or air speed, etc.

Any features of embodiment 10 may be readily combined or permuted with any of the other embodiments 11, 20, 30, 40, 50, 60, 70, 80, 91, 92, 93, 94, 95, 96, 97, 98, 99A, and/or 99B in accordance with the invention.

Figure 1B:
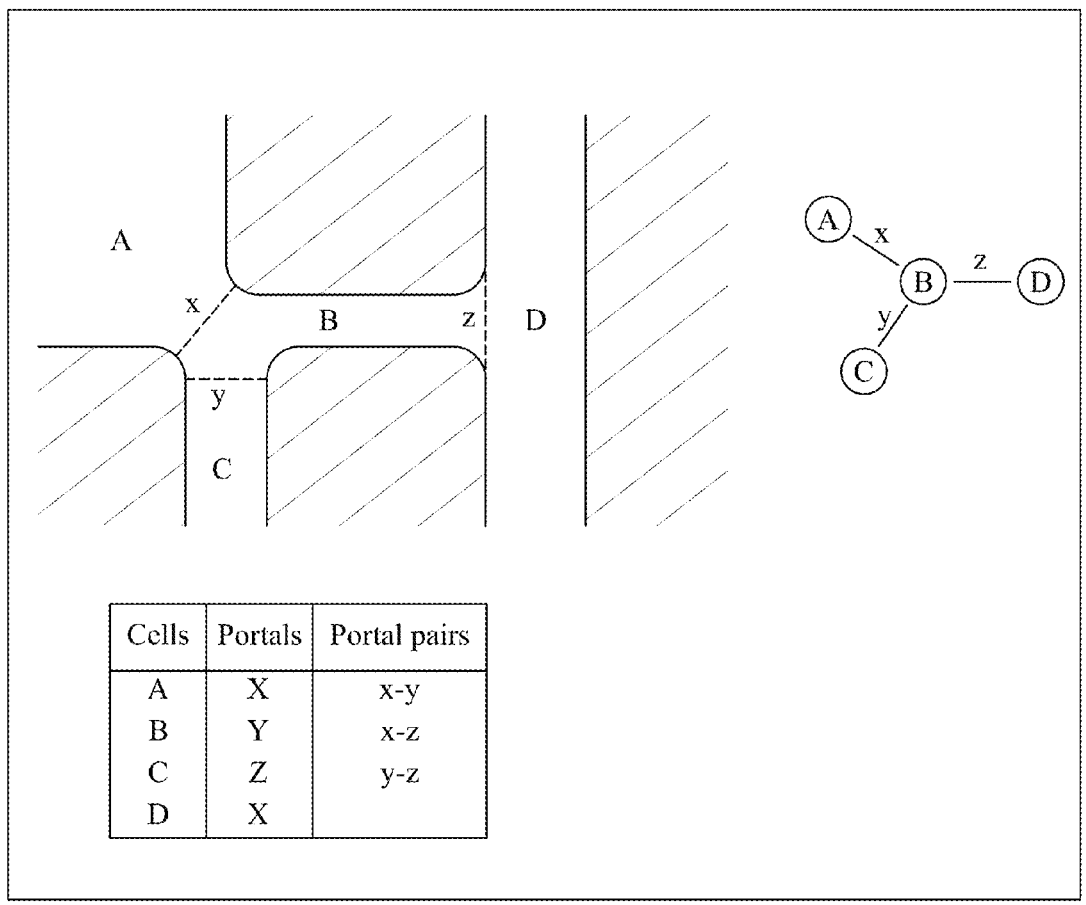
FIG. 1(B) demonstrates an embodiment 11 involving light propagation with portal pairs as a block diagram.

In FIG. 1(B), we see a preferable embodiment where a cell A of the 3D model may have, for example, illumination of luminosity 100 lux. Suppose the light propagation coefficient for portal pair x-z is 0.5, and thus we can compute that the light luminosity arriving to a cell D from portal z is 50 lux. Portal pairs are important over plain portals for the following reason: they can be used to code that the cell A illuminates the cell D more than a cell C illuminates the cell D, even though the cells A and C would have the same luminosity.

Any features of embodiment 11 may be readily combined or permuted with any of the other embodiments 10, 20, 30, 40, 50, 60, 70, 80, 91, 92, 93, 94, 95, 96, 97, 98, 99A, and/or 99B in accordance with the invention.

Figure 2:
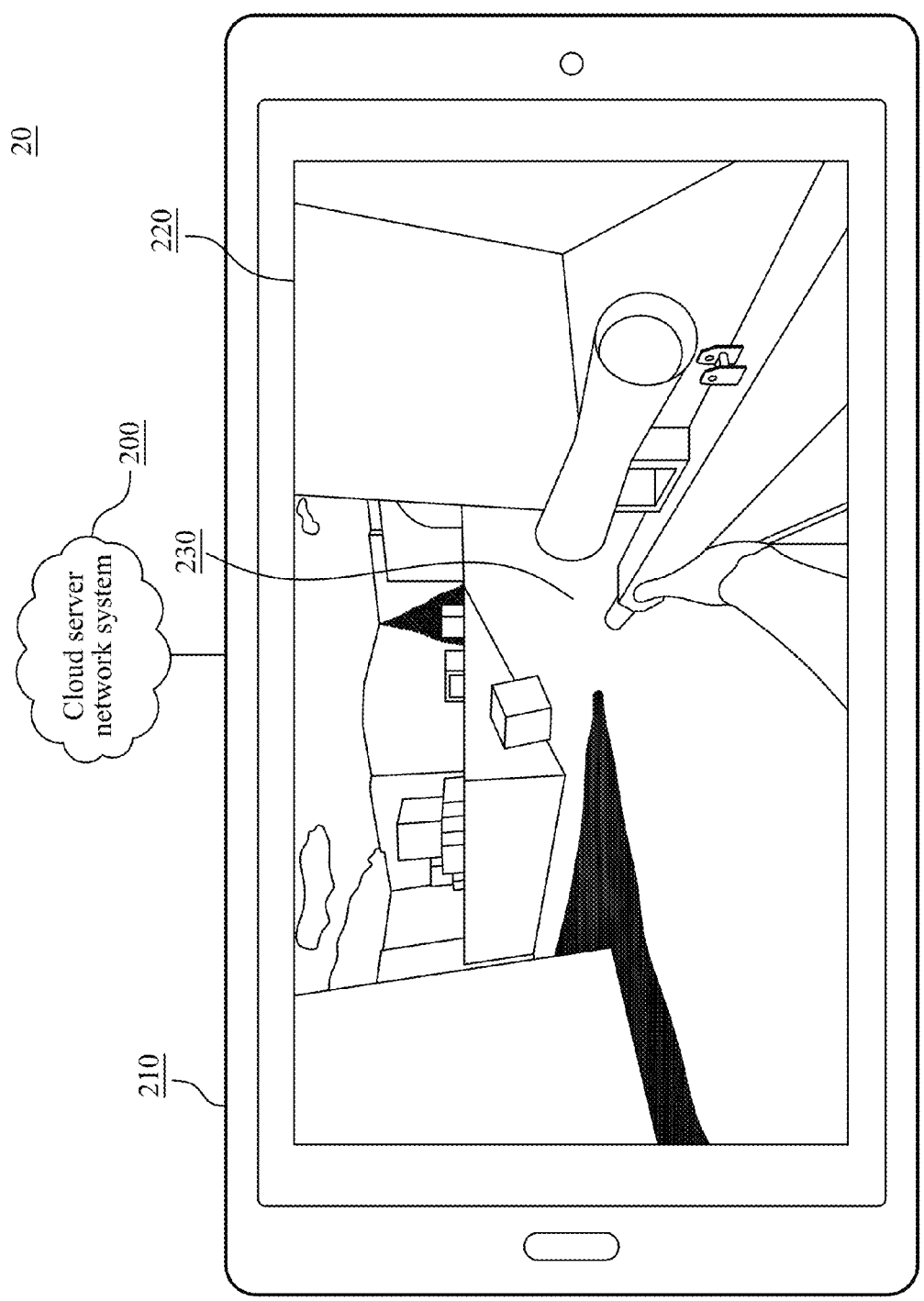
FIG. 2 demonstrates an embodiment 20 of a software program product user interface in accordance with the invention as a screen shot diagram.

FIG. 2 demonstrates an embodiment 20 of a software program product user interface in accordance with the invention as a screen shot diagram. This could be for example the screen of a tablet or a smartphone. The cloud server network system 200 behind the user interface could be e.g. embodiment 30 explained with respect to FIG. 3.

The software program product is stored on a non-transient memory medium on at least one of a cloud server network, the user terminal computer 210. The software program product may also be distributed between the cloud server network and the user terminal, so that some parts of the software program product reside on the cloud server network and some parts of the software program product reside on the user terminal computer 210.

The software program product is operable with at least one model upload computer, at least one cloud server network and/or at least one user terminal computer 210, and also via the communication network. Typically, the user terminal computer 210 is configured to have an application 220 installed that allows the user to access the 3D model. The application user interface could be the user interface of the aforementioned application 220. In an example, the application 220 may be configured as a virtual reality software application that provides a touch sensitive interface for allowing the user to access the 3D model.

Consider an example where the user logs in to the application 220 to play a 3D video game. The application 220 is configured to receive user inputs for playing the video game. The application 220 transmits dynamic location information and/or gesture information of the user to the cloud server network. The location information is determined from the user inputs. The cloud server network streams portions of the 3D model of the video game that are visible to the user according to the user's virtual location. For example, when the user plays the game on an Xbox 360 using Kinect as a motion sensor, the movement of the user is tracked in the game based on the user's gestures/movements as recorded by the motion sensor. In the context of the invention, if the user is determined to be entering a building campus, only an entrance area (herein part of 3D model) of the building campus is displayed to the user. As illustrated in view 230 of FIG. 2, the 3D model of the entrance area is displayed along with non-spatial information, such as, shadow of the buildings to provide the user a real-time experience.

Any features of embodiment 20 may be readily combined or permuted with any of the other embodiments 10, 11, 30, 40, 50, 60, 70, 80, 91, 92, 93, 94, 95, 96, 97, 98, 99A, and/or 99B in accordance with the invention.

Figure 3:
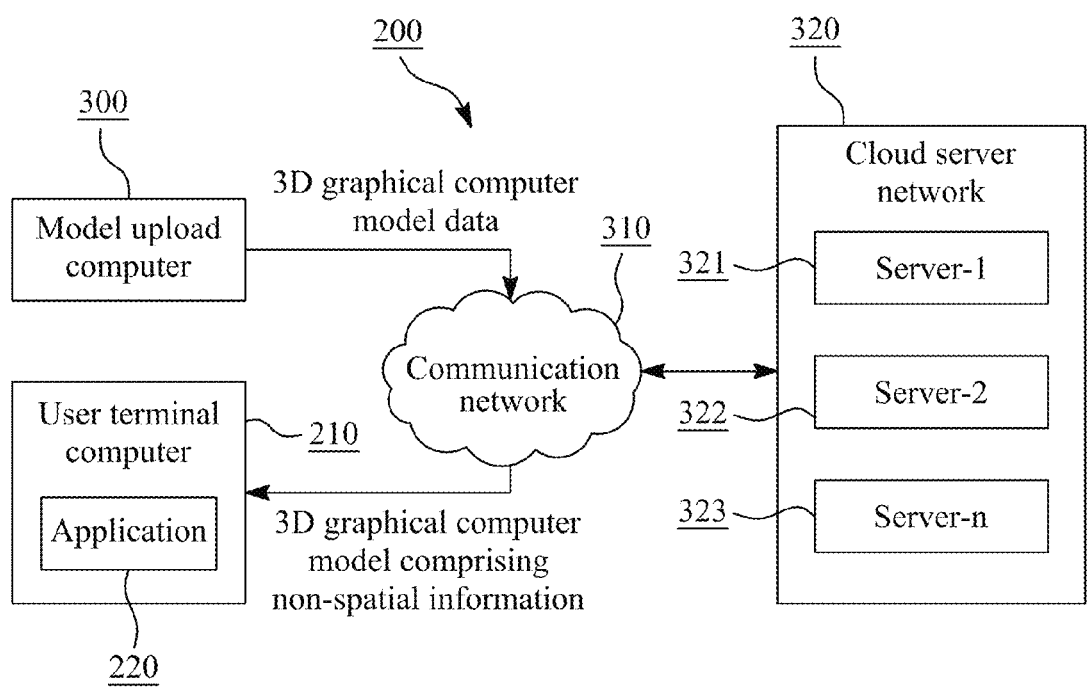
FIG. 3 demonstrates an embodiment 30 of a cloud server network system in accordance with the invention as a block diagram.

FIG. 3 demonstrates an embodiment 30 of the cloud server network system 200 in accordance with the invention as a block diagram. The cloud server network system 200 comprises the model upload computer 300, the cloud server network 320, and the user terminal computer 210.

The user terminal computer 210 may be configured as a mobile terminal computer, typically a smartphone and/or a tablet that is used to view the 3D models of objects comprising the spatial information and the non-spatial information. The user terminal computer 210 is typically a mobile smartphone, such as iOS, Android or a Windows Phone smartphone.

However, it is also possible that the user terminal computer 210 is a mobile station, mobile phone or a computer, such as a PC—computer, Apple Macintosh—computer, PDA—device (Personal Digital Assistant), or UMTS—(Universal Mobile Telecommunication System), GSM—(Global System for Mobile Telecommunications), WAP—(Wireless Application Protocol), Teldesic-, Inmarsat-, Iridium-, GPRS—(General Packet Radio Service), CDMA—(Code Division Multiple Access), GPS—(Global Positioning System), 3G-, 4G-, Bluetooth—, WLAN—(Wireless Local Area Network), Wi-Fi and/or WCDMA (Wideband Code Division Multiple Access)-mobile station. Sometimes in some embodiments the user terminal computer 210 is a device that has an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

The user terminal computer 210 provides the application 220 to allow the user to access the 3D models generated by the cloud server network 320. Preferably the user downloads the application 220 from the Internet, or the various app stores that are available from Google, Apple, Facebook and/or Microsoft. For example, in some embodiments an iPhone user with a Facebook application on his phone will download the application 220 that is compatible with both the Apple and Facebook developer requirements. Similarly, a customized application 220 can be produced for the other different handsets.

In an example implementation, the model upload computer 300 may be any type of a database server, a file server, a web server, an application server, etc., configured to store 3D model data generated by conventional 3D modelling software, for example, Autodesk 3ds Max, Blender, FreeCAD, computer aided three-dimensional interactive application (CATIA), AutoCAD, Strata 3D, etc. In an example, the model upload computer 300 may be a computer-aided design (CAD) server.

The cloud server network 320 comprises a plurality of servers, for example, 321, 322, 323, etc. The cloud server network 320 may comprise a plurality of databases for storing the 3D model data and the 3D models. The databases may be, for example, a structured query language (SQL) database, a NoSQL database such as the Microsoft® SQL Server, the Oracle® servers, the MySQL® database, etc. The cloud server network 320 may be deployed in a cloud environment managed by a cloud storage service provider, and the databases may be configured as cloud based databases implemented in the cloud environment.

The cloud server network 320 and the model upload computer 300, which may include an input-output device, usually comprises a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realise the cloud network used by the cloud network server of the invention. The cloud server network 320 can be purchased as a separate solution from known vendors such as Microsoft and Amazon and HP (Hewlett-Packard). The cloud server network 320 typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using flash as the backbone storage for the cloud server network 320 and/or the model upload computer 300 is preferred despite its high cost due to the reduced latency that is required and/or preferred for rendering 3D images and/or videos. I.e. when a person is playing a video game at a game store in Helsinki, there is no need to retrieve game-related data from a hard drive in San Francisco that would hamper gaming experience. Instead the game-related data is pulled from a Flash storage in Munich, Hamina or Stockholm, where the pan-global server farms with flash based capabilities might be located.

The model upload computer 300 and the user terminal computer 210 communicate with the cloud server network 320 via the communication network 310. The communication network 310 used for the communication in the invention is the wireless or wireline Internet or the telephony network, which is typically a cellular network such as UMTS—(Universal Mobile Telecommunication System), GSM—(Global System for Mobile Telecommunications), GPRS—(General Packet Radio Service), CDMA—(Code Division Multiple Access), 3G-, 4G-, Wi-Fi and/or WCDMA (Wideband Code Division Multiple Access)-network.

The model upload computer 300 uploads the 3D model data to the cloud server network 320, via the communication network 310. The cloud server network 320 composes the 3D model from the 3D model data. The cloud server network 320 partitions the composed 3D model into small voxel cells. The voxelization of the 3D model is explained in the embodiments 70, 80, and 90 and is not repeated for the sake of brevity.

The cloud server network 320 identifies a virtual location of the user within the 3D model. The cloud server network 320 displays parts of the 3D model in accordance with the virtual location of the user. The 3D model displays and/or reproduces additional non-spatial information, such as, reflectance and/or refraction attributes of light at a particular location in the 3D model, reflectance of sound at a particular location in the 3D model, smell, temperature, wind, quantity of natural light at a certain time, air speed, etc. Any features of embodiment 30 may be readily combined or permuted with any of the other embodiments 10, 11, 20, 40, 50, 60, 70, 80, 91, 92, 93, 94, 95, 96, 97, 98, 99A, and/or 99B in accordance with the invention.

Figure 4:
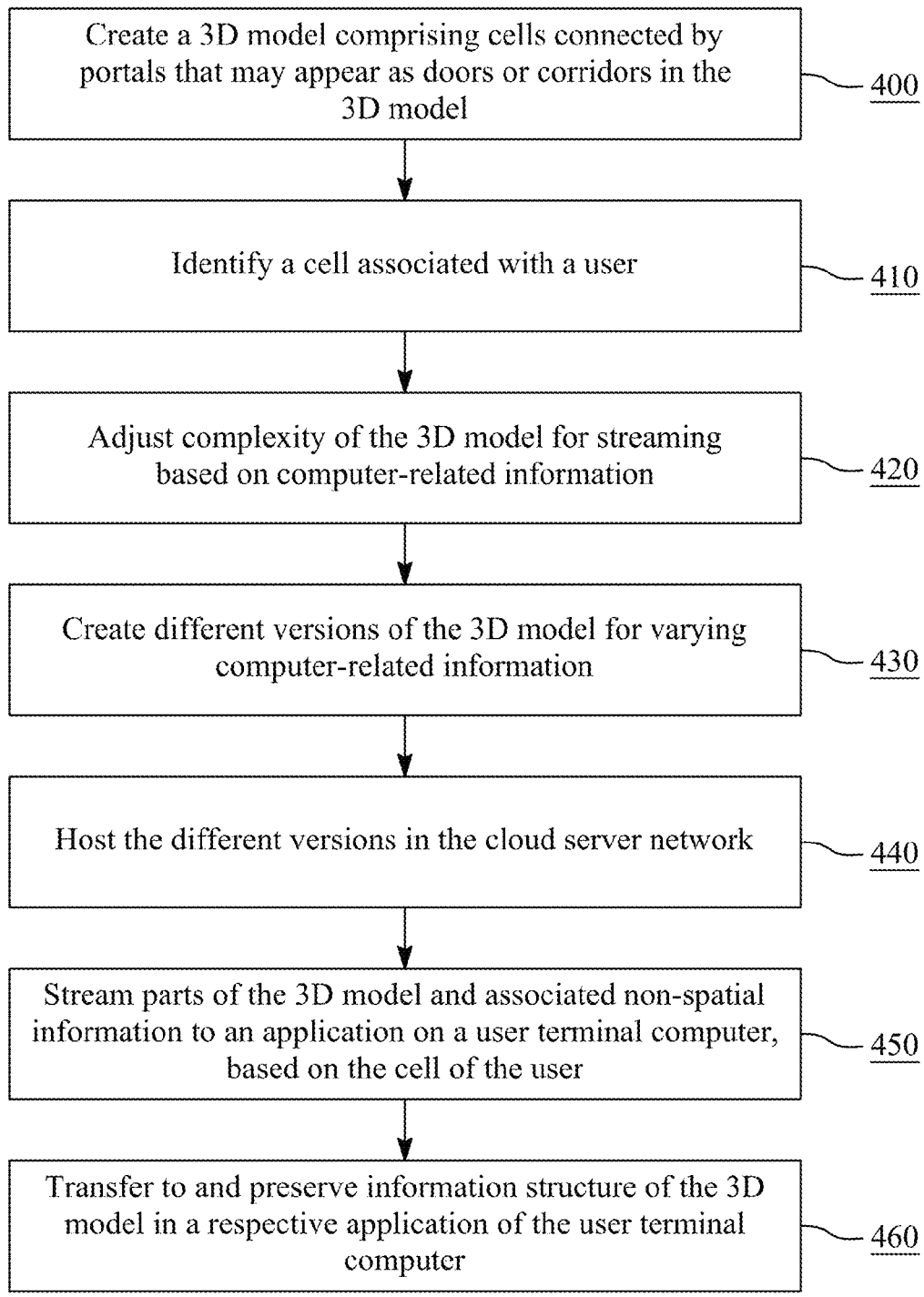
FIG. 4 demonstrates another embodiment 40 of a more elaborate method for experiencing the 3D model, in accordance with the invention as a flow diagram.
Figure 9B:
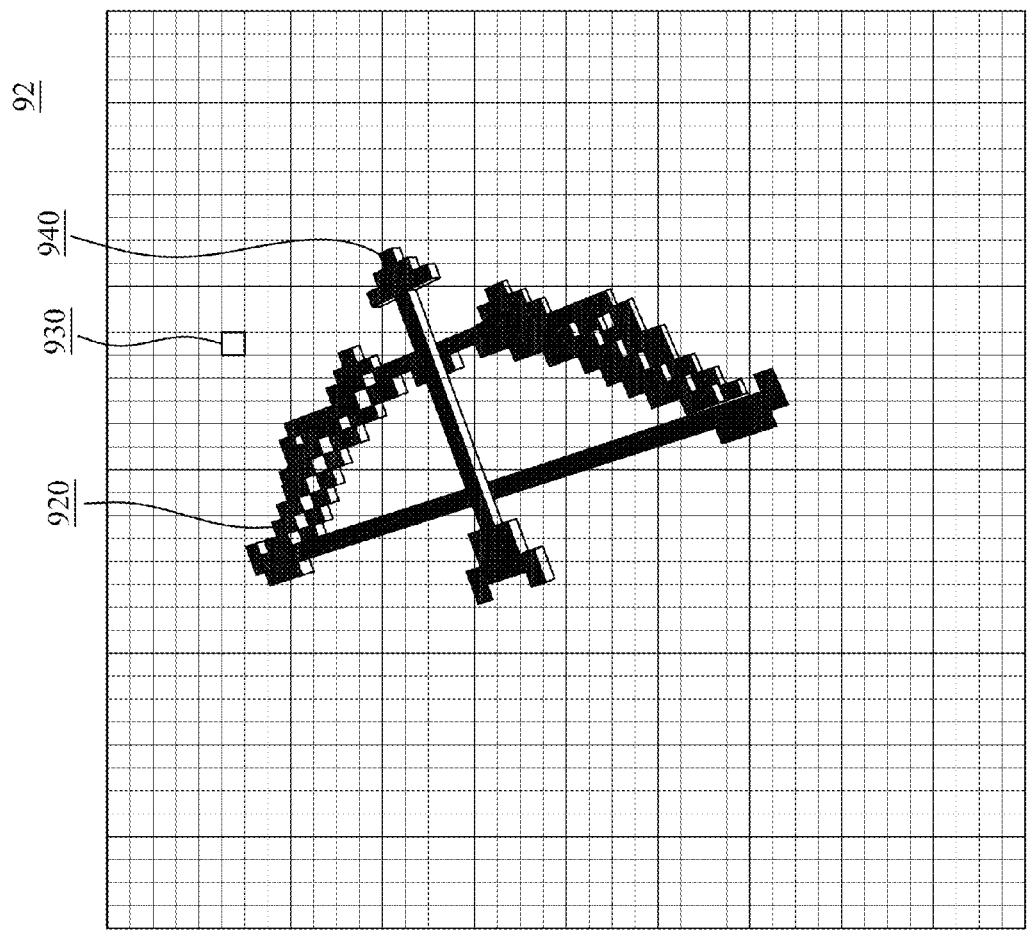
FIG. 9(B) demonstrates an embodiment 92 of another elaborate software program product user interface displaying voxelization of the 2D image, in accordance with the invention as a screen shot diagram.
Figure 9A:
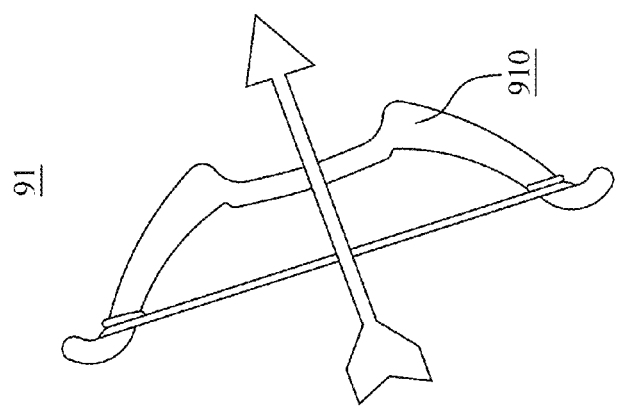
FIG. 9(A) demonstrates an embodiment 91 of a two-dimensional (2D) image of an object in a 2D scene, in accordance with the invention as a screen shot diagram.

FIG. 4 demonstrates another embodiment 40 of a more elaborate method for experiencing the 3D model, in accordance with the invention as a flow diagram. In phase 400, the cloud server network 320 creates the 3D model of a video game comprising voxel cells that are connected by portals. The portals may appear as doors or corridors in the 3D model. An exemplary illustration of the portal graph comprising the voxel cells is depicted in FIGS. 9A and 9B corresponding to the embodiments 91 and 92.

In phase 410, a cell associated with the user is identified. In an example, the cell may be identified based on the user's location identified by mouse tracking techniques. In phase 420, complexity of the 3D model is adjusted for streaming based on computer-related information. The computer-related information comprises, for example, available streaming bandwidth, memory information, and/or processing power of the user terminal computer 210. For example, if the available streaming bandwidth is low, then only portions visible from the user's location in the 3D model are displayed to the user. In another example, if the available streaming bandwidth is high, then the entire 3D model may be displayed to the user. Similarly, if the processing power of the user terminal computer 210 is slow then only portions of the 3D model are displayed to the user. When the processing power is fast, then the entire 3D model is displayed on the application 220.

Different versions of the 3D model may be created based on varying computer-related information, in phase 430. For example, a version 1 is created for a user terminal computer 210 with a large memory space and a version 2 is created for another user terminal computer 210 with a small memory space. In phase 440, the different versions of the 3D model are hosted in the cloud server network 320. The different versions can be accessed by a respective user terminal computer 210 in real time, based on the corresponding computer-related information of the respective user terminal computer 210. The creation of the different versions of the 3D model ensures adequate consumption of terminal memory space and time effective rendering of the 3D model.

In phase 450, parts of the 3D model and corresponding non-spatial information are streamed to the application 220 of the user terminal computer 210 corresponding to the identified cell of the user according to location of the user. In phase 460, information structure of the streamed parts of the 3D model is transferred to and preserved in the respective application 220 of the user terminal computer 210. This means that the same graphical model generated from one model upload computer could be used by multiple different applications in the cloud network.

Any features of embodiment 40 may be readily combined or permuted with any of the other embodiments 10, 11, 20, 30, 50, 60, 70, 80, 91, 92, 93, 94, 95, 96, 97, 98, 99A, and/or 99B in accordance with the invention.

Figure 5:
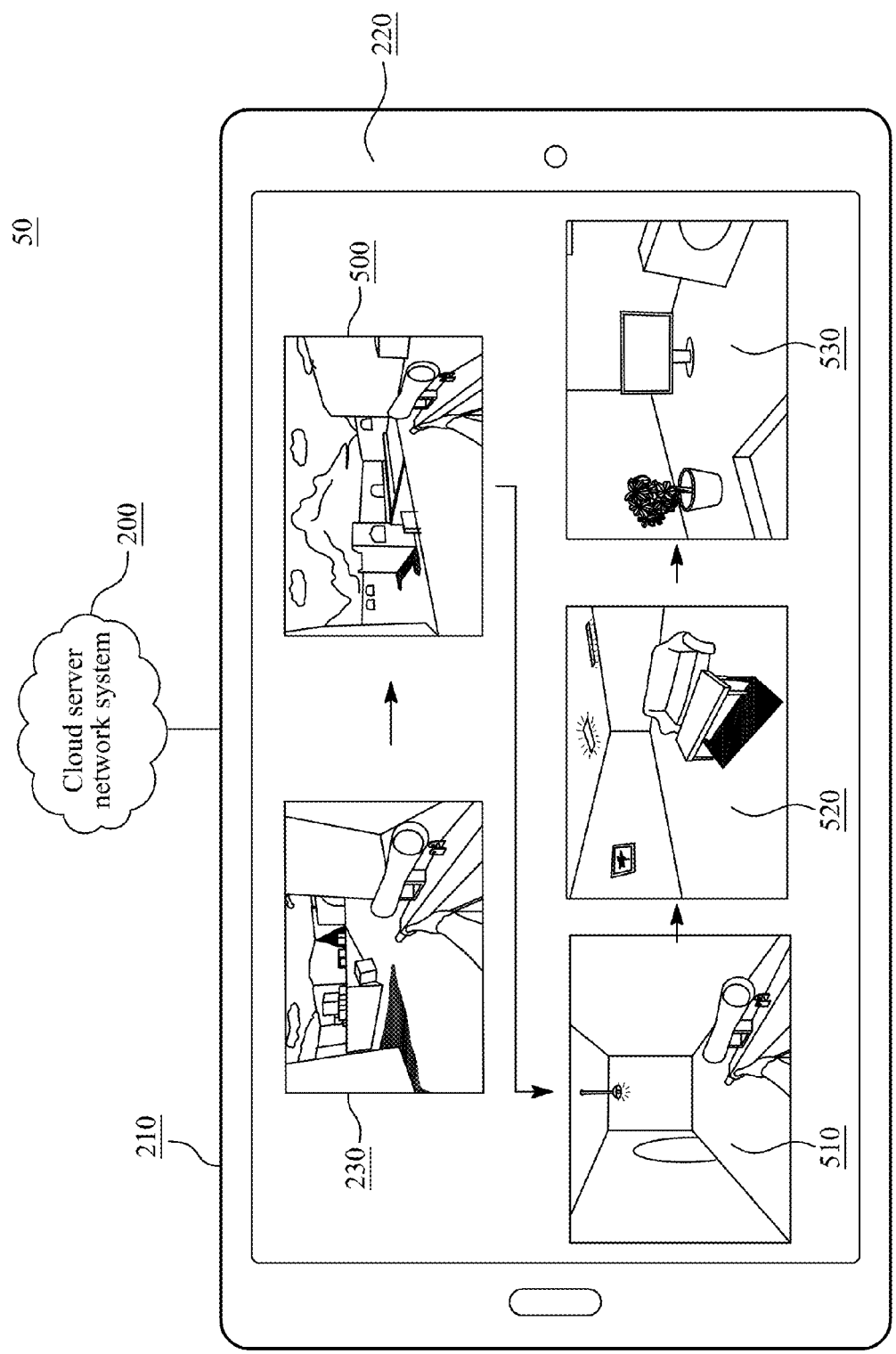
FIG. 5 demonstrates another embodiment 50 of a more elaborate software program product user interface in accordance with the invention as a screen shot diagram.

FIG. 5 demonstrates another embodiment 50 of a more elaborate software program product user interface in accordance with the invention as a screen shot diagram.

The cloud server network 320 identifies a location of the user in the 3D model. The cloud server network 320 streams parts of the 3D model and the associated non-spatial information to the application 220 on the user terminal computer 210. The parts of the 3D model that are streamed are prioritised based on a cell associated with the user's location. Prioritization provides for example, a cell representing the user's location, another cell that is visible from the user's cell, or another cell that is near the user's cell.

Consider an example of the user playing a video game. The user downloads the application 220 from the cloud server network 320 for viewing a 3D version of the video game. The cloud server network 320 dynamically identifies a current location of the user and displays portions of the game that may be visible to the user from the current location. For example, as the user navigates his way through an entrance of a building campus, then to another section of the building campus, and finally walks through a hallway to enter a room and a cabin inside the room. In such example scenario, only portions of the 3D model that may be visible from the user's location are displayed to the user, as exemplarily illustrated in FIG. 5. The 3D model of the video game is rendered with a 3D spatial visualization of the game and non-spatial features as well. For example, in view 230, the shadows created by the building are depicted. In views 510 and 520, the light reflected from bulbs and lamps and shadow of a table in the room are illustrated. View 530 displays a flower pot, and the user may sense smell of the flowers by employing conventional olfactory technology. For example, the user may use an odour dispenser to reproduce any pre-programmed odours from the non-spatial information to the user to create a precise virtual reality experience in the course of playing the game. The electronic nose receives the relevant smell information from the cloud server network 320.

Any features of embodiment 50 may be readily combined or permuted with any of the other embodiments 10, 11, 20, 30, 40, 60, 70, 80, 91, 92, 93, 94, 95, 96, 97, 98, 99A, and/or 99B in accordance with the invention.

Figure 6:
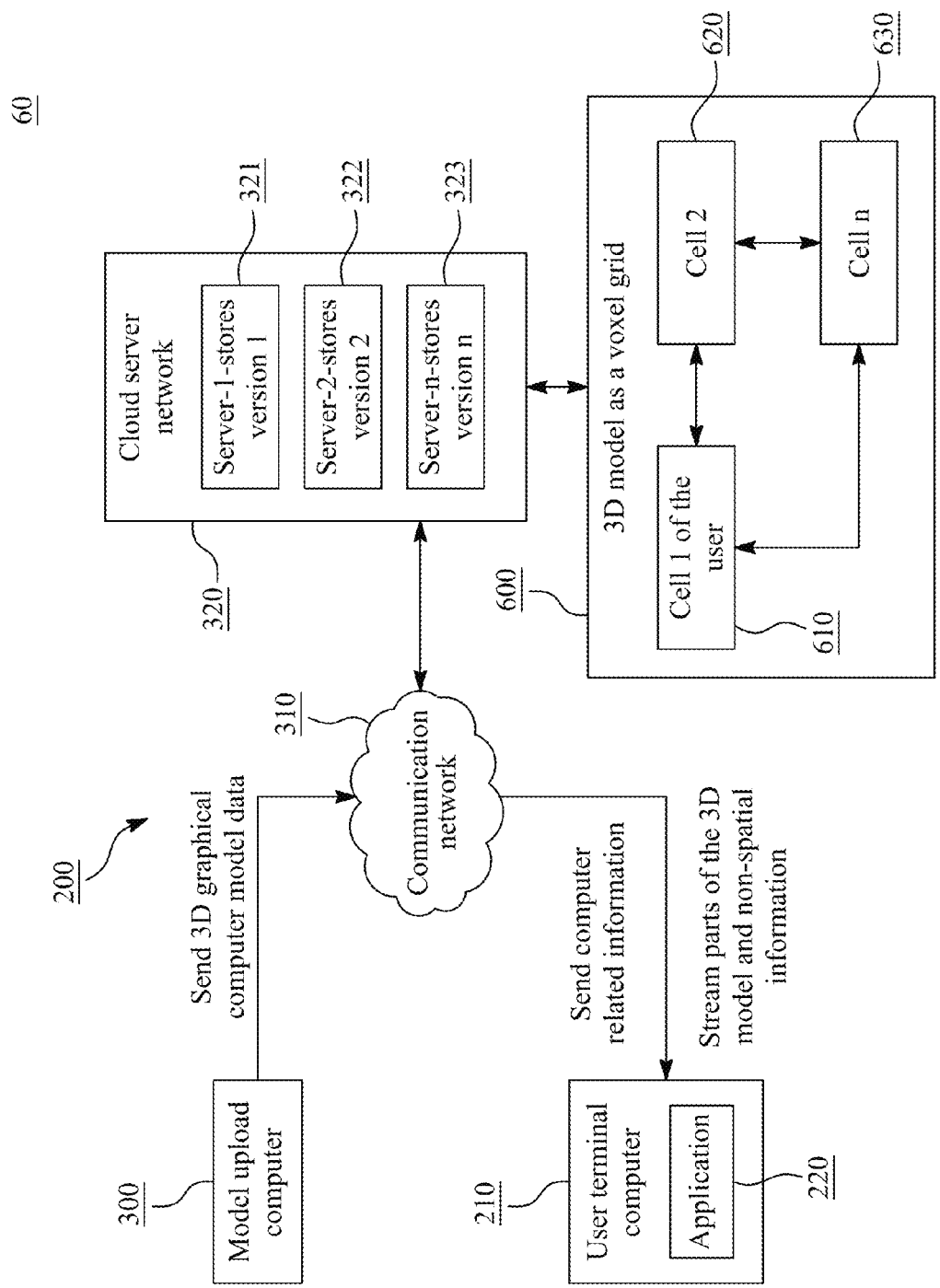
FIG. 6 demonstrates another embodiment 60 of a more elaborate cloud server network system in accordance with the invention as a block diagram.

FIG. 6 demonstrates another embodiment 60 of a more elaborate cloud server network system 200 in accordance with the invention as a block diagram. The model upload computer 300 is configured to store 3D model data. The model upload computer 300 sends the 3D model data to the cloud server network 320 via the communication network 310.

The cloud server network 320 comprises the plurality of servers, for example, 321, 322, 323, etc. The cloud server network 320 uses the 3D model data to create different versions of 3D models for different user terminal computers 210. The cloud server network 320 creates different versions of the 3D model of different sizes from the 3D model for different computer-related information, such as, bandwidth, memory, and/or processing power environments. The cloud server network 320 adjusts the complexity of the 3D model based on the available streaming bandwidth, memory, and/or processing power of the user terminal computer 210. The cloud server network 320 hosts the different versions of the 3D model in the different servers, for example, 321, 322, 323, etc., of the cloud server network 320. For example, the server 321 stores a version 1 of the 3D models associated with memory space of different user terminal computers 210, while server 322 may store version 2 of the 3D models associated with streaming bandwidth of different user terminal computers 210, and so on.

Each 3D model is configured as a voxel grid 600 with portal graphs. The voxel grid 600 comprises a plurality of cells, for example, 610, 620, 630, etc. The cells, for example, 610, 620, 630, etc., are connected by portals that may appear as doors or corridors in the 3D model. For example, a 3D model may comprise 3 cells, where cell 610 is related to a location of the user using the user terminal computer 210, and cells 620 and 630 are in the vicinity of the user' location. The 3 cells, for example, 610, 620, 630, etc., are separated by portals between them in the voxel grid.

The cloud server network 320 streams parts of the 3D model and the associated non-spatial information to the application 220 on the user terminal computer 210. The parts of the 3D model that are streamed are prioritised based on the cell 610 associated with the user. For example, the cell 610 representing to the user's location, the cell 620 or 630 that is visible from the user's cell 610, or the cell 620 or 630 that is near the user's cell 610.

The application 220 installed in the user terminal computer 210 displays the streamed parts of the 3D model that are associated with the cell 610 identified to the user.

Any features of embodiment 60 may be readily combined or permuted with any of the other embodiments 10, 11, 20, 30, 40, 50, 70, 80, 91, 92, 93, 94, 95, 96, 97, 98, 99A, and/or 99B in accordance with the invention.

Figure 7:
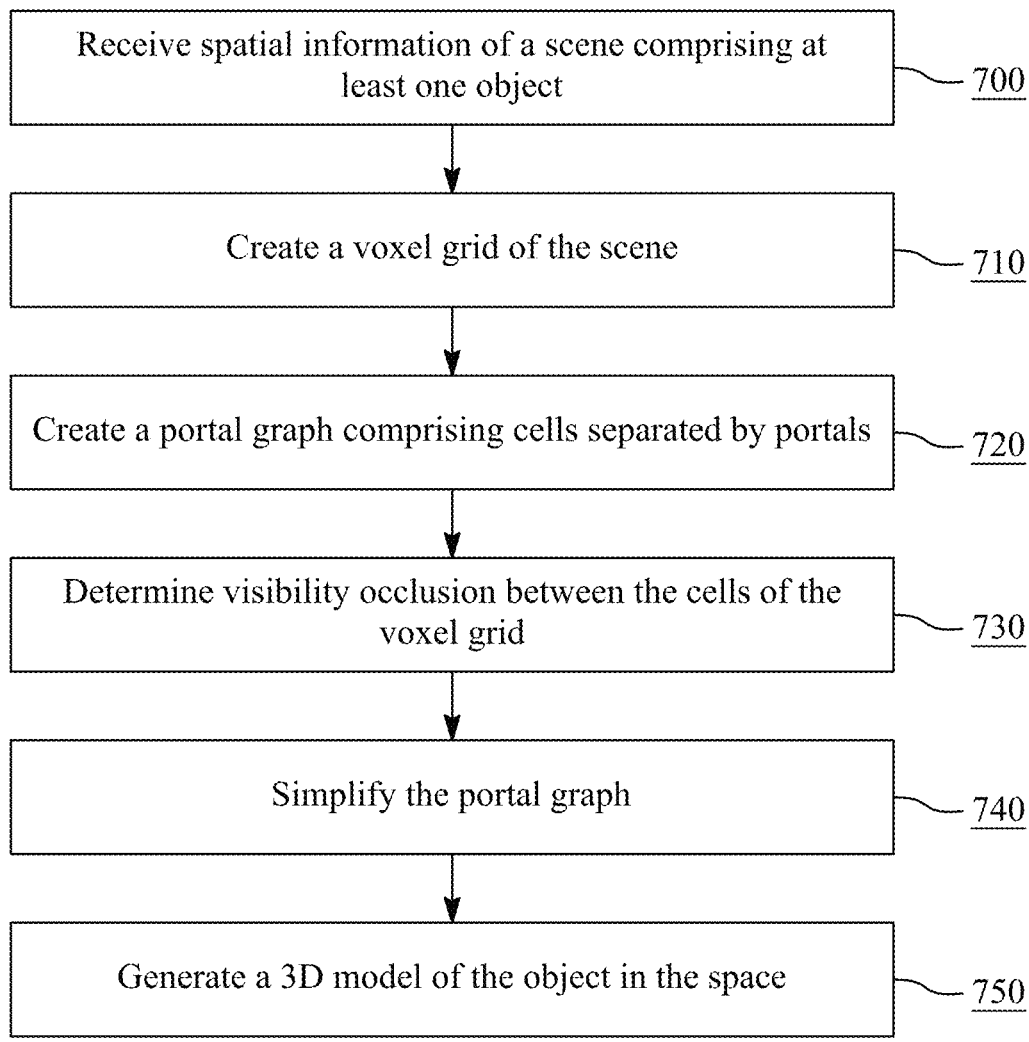
FIG. 7 demonstrates an embodiment 70 of a method of building a voxel grid with portal graphs, in accordance with the invention as a flow diagram.

FIG. 7 demonstrates an embodiment 70 of a method of building a voxel grid with portal graphs, in accordance with the invention as a flow diagram. In phase 700, spatial information of a scene is received. The scene may be one of a 2D scene or a 3D scene. The scene may comprise at least one object. The object may be of any shape or size, for example, a point, a line, a curve, a triangle, a polygon, etc.

In phase 710, a voxel grid of the scene is created. The voxel grid of the scene is created by creating solid or empty voxels based on intersection of different voxels with geometry of the object. If a voxel intersects with the object geometry, then the voxel is solid. And if the voxel does not intersect with the object geometry, then the voxel is empty. This way, based on the intersection of the object geometry with the voxels of the scene, the voxel grid is created. The solid voxels represent the geometry of the object in the voxel grid.

In phase 720, a portal graph for the voxel grid is created. The portal graph comprises portals separating different cells of the voxel grid. The voxel grid comprises multiple voxel cells. An initial cell size is determined. In an example, the cell size may be determined based on a granularity value for sampling scene occlusion features. The cells that are not separated by the object geometry are separated by portals. When a neighboring voxel belongs to a different cell that is separated by the object geometry, a portal is placed between the neighboring voxels. The portal graph displays the voxel cells separated by the portals in between the object geometry.

In phase 730, visibility occlusion between the cells of the voxel grid is determined. A ray of light is sent between a random point on a current cell group of a voxel and a random point on a neighboring cell, to determine the visibility between the two points.

In phase 740, the portal graph is simplified. The portal graph is simplified based on the number of occluded rays between the cells. If the count of rays that are blocked by the object geometry is below a predetermined threshold value, then the neighboring cell is considered as part of the current cell group. If the count of rays that are blocked by the object geometry is above the predetermined threshold value, then the neighboring cell initiates another cell group. This way, different cells are separated by portals based on the visibility occlusion between the cells. In phase 750, a 3D model of the object in the scene is generated, based on the simplified portal graph. This model is uploaded to the cloud network for later whole or partial display to terminal computers in accordance with the invention.

Any features of embodiment 70 may be readily combined or permuted with any of the other embodiments 10, 11, 20, 30, 40, 50, 60, 80, 91, 92, 93, 94, 95, 96, 97, 98, 99A, and/or 99B in accordance with the invention.

Figure 8:
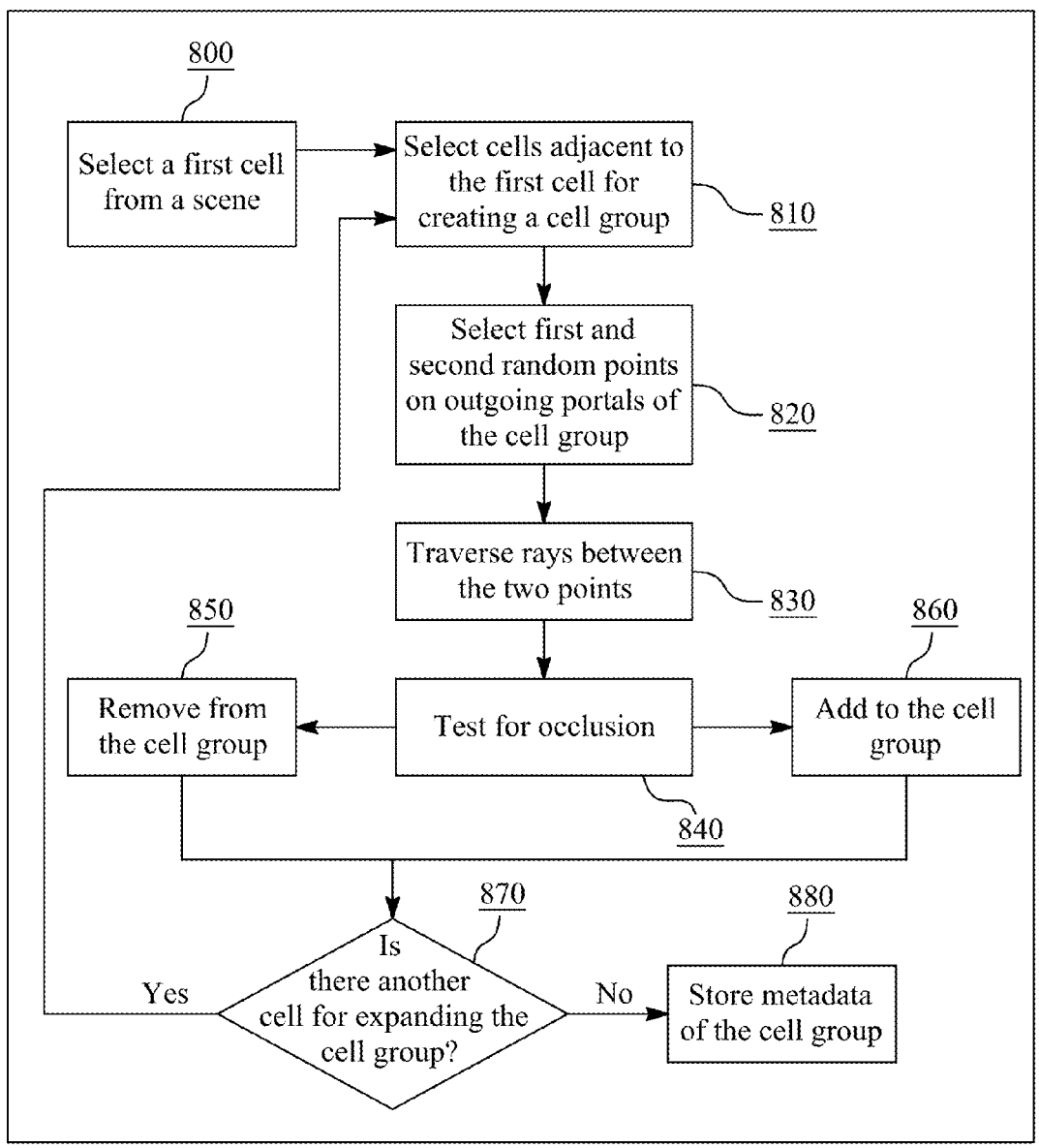
FIG. 8 demonstrates an embodiment 80 of a method of ray traversal visibility sampling of a voxel grid, in accordance with the invention as a flow diagram.

FIG. 8 demonstrates an embodiment 80 of a method of ray traversal visibility sampling of a voxel grid, in accordance with the invention as a flow diagram. In phase 800, a first cell is selected for generating a 3D model of a scene. In phase 810, an adjacent cell is selected for creating a cell group.

In phase 820, a first point and a second point is selected on outgoing portals of the first cell. In phase 830, rays between the two points are traversed. In phase 840, the traversed rays are tested for visibility occlusion. In phase 850, if the adjacent cell is occluded, then the adjacent cell is not included in the cell group for the first cell. In phase 860, if the adjacent cell is not occluded, then the adjacent cell is included in the cell group of the first cell.

In phase 870, another adjacent cell is checked for expanding the cell group. Each adjacent cell is checked in a closed loop for expanding the cell group. Phases 820 to 860 are repeated until there is no adjacent cell present in the scene for creating the 3D model of the scene.

In phase 880, metadata of the cell groups of the voxel grid are stored. The stored metadata is used to create the 3D model of the scene. Additional non-spatial metadata is then included in the model. Subsequently, this model is uploaded to the cloud network for later whole or partial display to terminal computers in accordance with the invention.

Any features of embodiment 80 may be readily combined or permuted with any of the other embodiments 10, 11, 20, 30, 40, 50, 60, 70, 91, 92, 93, 94, 95, 96, 97, 98, 99A, and/or 99B in accordance with the invention.

FIG. 9(A) demonstrates an embodiment 91 of a two-dimensional (2D) image 910 of an object in a 2D scene, in accordance with the invention as a screen shot diagram. The object, for example, is a 2D image of a bow and arrow.

FIG. 9(B) demonstrates an embodiment 92 of another elaborate software program product user interface displaying voxelization of the 2D image 910, in accordance with the invention as a screen shot diagram. FIG. 9(B) illustrates a voxelized image 920 of the 2D image 910. Each dot of the 2D image is represented as a voxel 930. When voxels 940 intersect with geometry of the 2D object, the respective voxels 940 are filled. When the voxels 930 do not intersect with the geometry of the 2D object in the scene, then the respective voxels 930 are empty. The model in 92 could be uploaded to the cloud network in accordance with the invention.

Any features of embodiments 91 and 92 may be readily combined or permuted with any of the other embodiments 10, 11, 20, 30, 40, 50, 60, 70, 80, 93, 94, 95, 96, 97, 98, 99A, and/or 99B in accordance with the invention.

Figure 10:
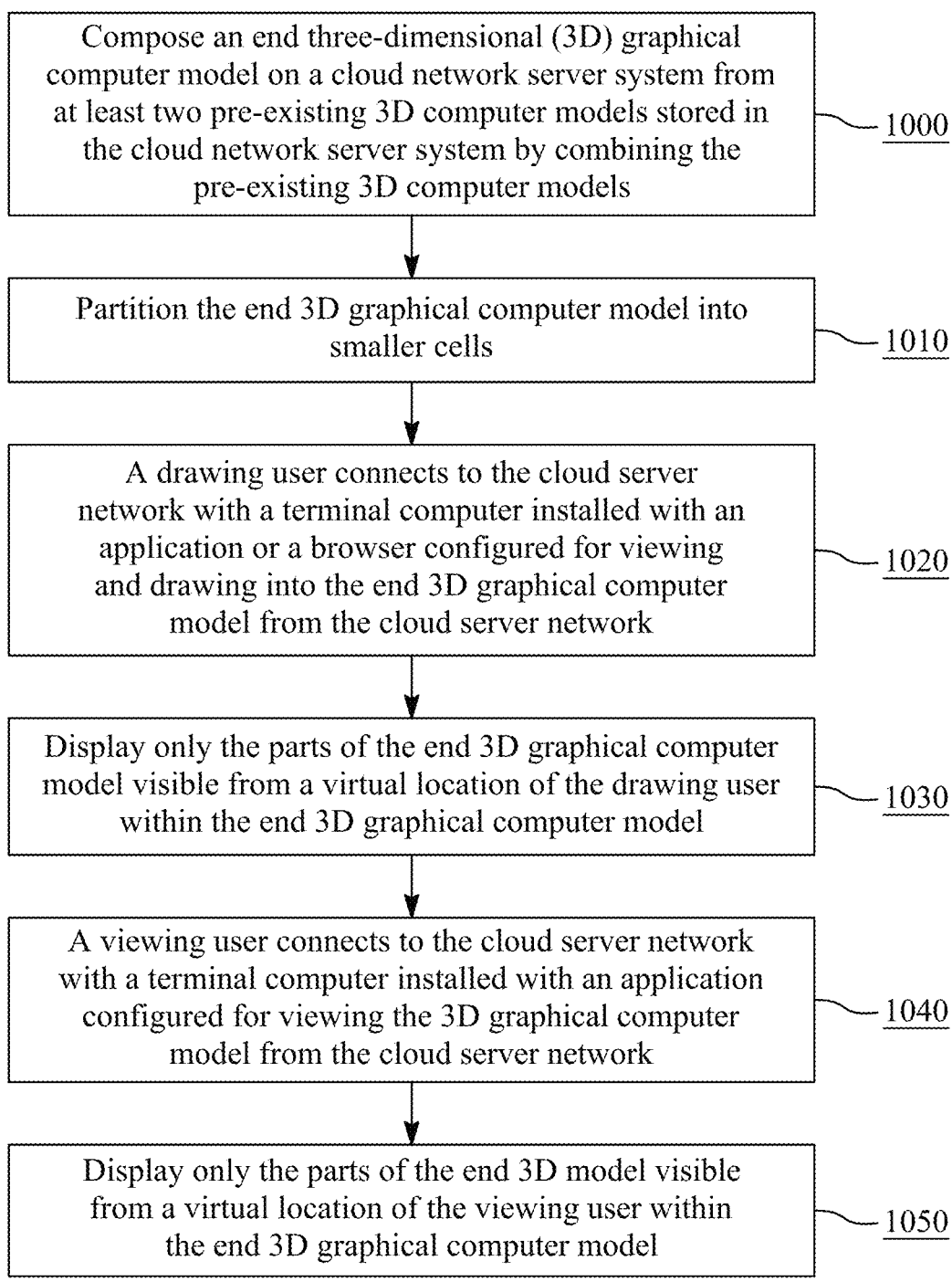
FIG. 10 demonstrates an embodiment 93 of a method of compiling and presenting a 3D model, in accordance with the invention as a flow diagram.

FIG. 10 demonstrates an embodiment 93 of a method of compiling and presenting a 3D model, in accordance with the invention as a flow diagram. The method could be implemented in a system identical or similar to embodiment 94 in FIG. 11 for example, as discussed in the other parts of the description. An end-user of the method could use a user interface identical or similar to that disclosed with embodiments 95 and 98 in FIG. 12 and FIG. 15, respectively.

The method provides a powerful and time-efficient virtual reality experience of 3D computer graphics to a user designing a 3D model. The method for compiling and presenting the 3D model inventively provides the distributed cloud network server system 200 that uses pre-existing 3D models for compiling an end 3D graphical computer model even with limited data communication speed and/or data storage capacity. As used herein, the phrase "end 3D graphical computer model" refers to a 3D model built based on two or more pre-existing 3D models or model components. The end 3D graphical computer models may be hereinafter referred to as "end 3D models". The cloud network server system 200 comprises the cloud server network 320, a drawing user terminal computer, a viewing user terminal computer, and the communication network 310 which is typically a cloud network. A drawing user accesses the cloud server network 320 via the drawing user terminal computer for viewing and drawing the end 3D models. A viewing user accesses the cloud server network 320 via the viewing user terminal computer for viewing the end 3D models.

In phase 1000, the end 3D model is composed on the cloud network server system 200 from at least two pre-existing 3D models by combining the at least two pre-existing 3D models. In an embodiment, the end 3D model may be composed from the at least two pre-existing models using conventional 3D modelling software such as, 3DS Max, Blender, Cinema 4D, Lightwave3D, Maya, Modo, Motion Builder, Softimage 3D, etc. The at least two pre-existing 3D models are stored in a data storage unit (or a cloud based database implemented in the cloud computing environment) of the cloud network server system 200. The end 3D model is also stored in the data storage of the cloud network server system 200.

In phase 1010, the end 3D model is partitioned into smaller cells. The end 3D model may be configured as a voxel grid comprising portal graphs, as explained in the detailed description of FIG. 1(A). An exemplary illustration of the voxel grid comprising the portal graphs is depicted in FIG. 9(B) corresponding to the embodiment 92.

In phase 1020, a drawing user connects to the cloud server network 320 with a terminal computer (or a drawing user terminal computer) installed with an application or a browser (or a drawing application). The application is configured for viewing and drawing into the end 3D model from the cloud server network 320. An exemplary user interface of the drawing application in accordance with the invention is illustrated in the embodiments 95 and 98 of FIG. 12 and FIG. 15, respectively.

In phase 1030, only the parts of the end 3D model that are visible from a virtual location of the drawing user within the end 3D model are displayed to the drawing user. The virtual location of the drawing user may be detected using conventional detection techniques such as, mouse tracking techniques, 3D immersive touch user interface, etc.

In phase 1040, a viewing user connects to the cloud server network 320 with the viewing user terminal computer installed with an application (or a viewing application) configured for viewing the end 3D model from the cloud server network 320. An exemplary user interface of the viewing application in accordance with the invention is illustrated in the embodiments 95 and 98 of FIG. 12 and FIG. 15, respectively.

In phase 1050, only the parts of the end 3D model visible from a virtual location of the viewing user within the end 3D model are displayed to the viewing user. The virtual location of the viewing user may be detected using conventional detection techniques such as, mouse tracking techniques, 3D immersive touch user interface, etc.

Any features of embodiment 93 may be readily combined or permuted with any of the other embodiments 10, 11, 20, 30, 40, 50, 60, 70, 80, 91, 92, 94, 95, 96, 97, 98, 99A, and/or 99B in accordance with the invention.

Figure 11:
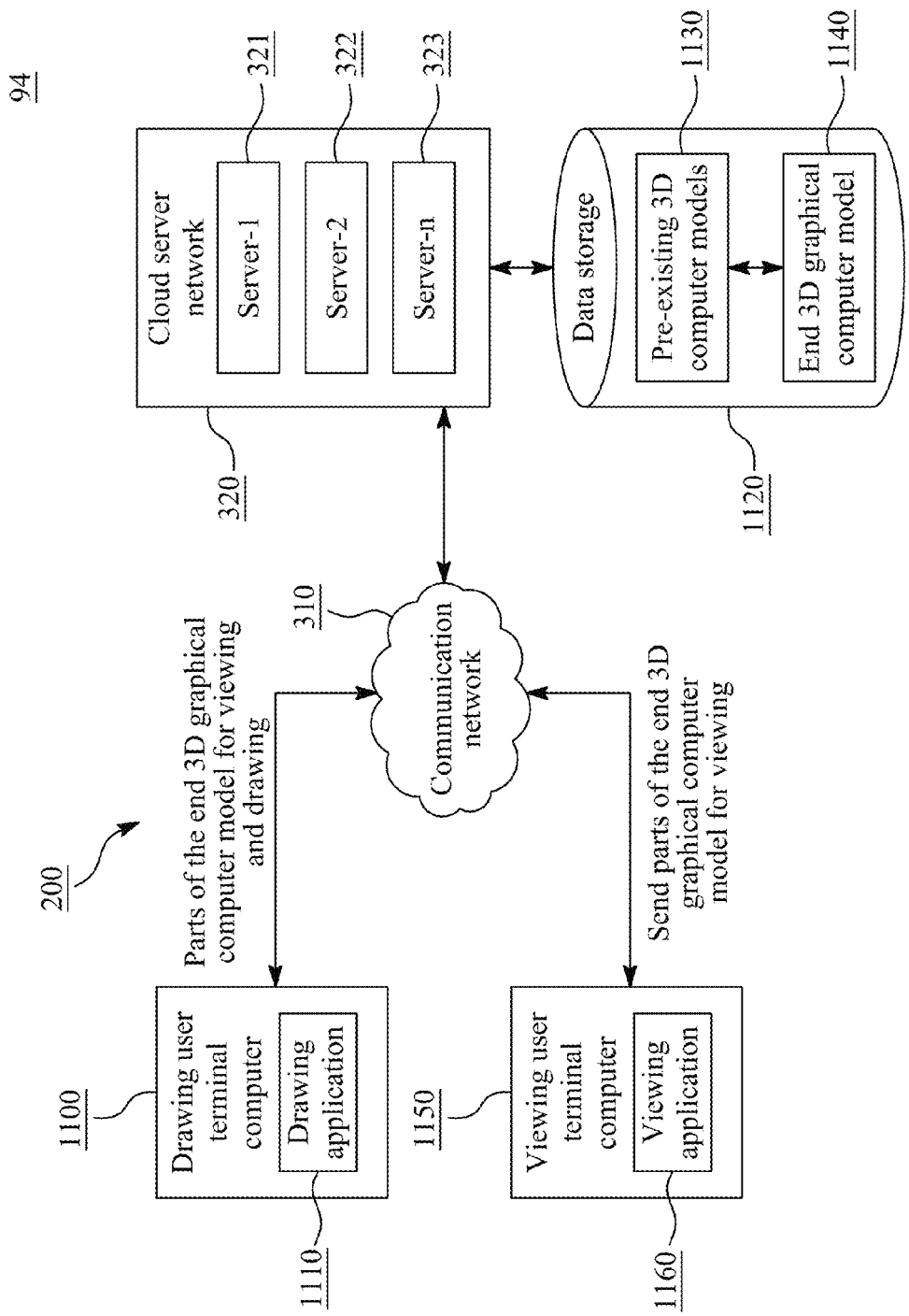
FIG. 11 demonstrates an embodiment 94 of a more elaborate cloud network server system for compiling and presenting the 3D model, in accordance with the invention as a block diagram.

FIG. 11 demonstrates an embodiment 94 of a more elaborate cloud network server system 200 for compiling and presenting the end 3D model 1140, in accordance with the invention as a block diagram. The cloud network server system 200 comprises the cloud server network 320, the drawing user terminal computer 1100, and the viewing user terminal computer 1150. The drawing user terminal computer 1100 and the viewing user terminal computer 1150 access the cloud server network 320 via the communication network 310. The drawing user terminal computer 1100 and the viewing user terminal computer 1150 are typically a mobile smartphone, such as iOS, Android or a Windows Phone smartphone.

However, it is also possible that the drawing user terminal computer 1100 or the viewing user terminal computer 1150 is a mobile station, mobile phone or a computer, such as a PC—computer, Apple Macintosh—computer, PDA—device (Personal Digital Assistant), or UMTS—(Universal Mobile Telecommunication System), GSM—(Global System for Mobile Telecommunications), WAP—(Wireless Application Protocol), Teldesic-, Inmarsat-, Iridium-, GPRS—(General Packet Radio Service), CDMA—(Code Division Multiple Access), GPS—(Global Positioning System), 3G-, 4G-, Bluetooth-, WLAN—(Wireless Local Area Network), Wi-Fi and/or WCDMA (Wideband Code Division Multiple Access)-mobile station. Sometimes in some embodiments the drawing user terminal computer 1100 or the viewing user terminal computer 1150 is a device that has an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

The cloud server network 320 comprises a plurality of servers 321, 322, 323, etc., configured for composing end 3D models 1140 from pre-existing 3D models 1130. The servers 321, 322, 323, etc., may be configured to compose different versions of the end 3D models 1140 for different types of the drawing user terminal computers 1100 or the viewing user terminal computers 1150. The pre-existing 3D models 1130 and end 3D models 1140 uploaded by the drawing user terminal computer 1100 are stored in the data storage 1120. The data storage 1120 may be, for example, a structured query language (SQL) database, a NoSQL database such as the Microsoft® SQL Server, the Oracle® servers, the MySQL® database, etc. The cloud server network 320 may be deployed in a cloud environment managed by a cloud storage service provider, and the data storage 1120 may be configured as cloud based databases implemented in the cloud environment.

The cloud server network 320 composes the end 3D model 1140 from the pre-existing 3D models 1130 stored in the data storage 1120 of the cloud server network 320. The cloud server network 320 composes the end 3D model 1140 by combining the pre-existing 3D computer models 1130. In an example implementation, the data storage 1120 may comprise 3 pre-existing models 1130 corresponding to a reception area of a building. The cloud server network 320 may combine the pre-existing models 1130 (the 3 reception area models) to compose an end 3D model (of the reception area). In an embodiment, the drawing user may provide preferences such as, reception area size, a floor design, wall or ceiling colour, etc., via the drawing application 1110. The cloud server network 320 composes the end reception area model by incorporating the preferences into the end 3D model 1140 composed by combining the pre-existing models 1130. The end 3D model 1140 hence created is stored in the data storage 1120.

The cloud server network 320 partitions the end 3D model 1140 into smaller cells. Due to the partitioning, the end 3D model 1140 is configured as a voxel grid with portal graphs. The process of partitioning the end 3D model 1140 into the voxel grid maybe explained in correspondence to the detailed description of FIG. 1(A). The voxel grid created may be similar to the exemplary illustration of the portal graph comprising the voxel cells as depicted in FIG. 9(B) corresponding to the embodiment 92.

The drawing user connects to the cloud server network 320 with the drawing user terminal computer 1100. The drawing user terminal computer 1100 is configured to be a mobile terminal computer, such as a tablet and/or mobile phone or a desktop computer.

The drawing user terminal computer 1100 is installed with an application 1110 or a browser (or a drawing application) configured for viewing and drawing into the end 3D model 1140 from the cloud server network 320, via the communication network 310. An exemplary user interface of the drawing application 1110 in accordance with the invention is illustrated in the embodiments 95 and 98 of FIG. 12 and FIG. 15, respectively. Only the parts of the end 3D model 1140 visible from a virtual location of the drawing user within the end 3D model 1140 are displayed on the drawing user terminal computer 1100. The cloud server network 320 receives the virtual location of the drawing user from the drawing user terminal computer 1100 using conventional detection techniques such as, gesture recognition techniques, facial recognition systems, 3D immersive touch user interface, etc.

A viewing user connects to the cloud server network 320 with the viewing user terminal computer 1150 installed with an application 1160 (or a viewing application) configured for viewing the end 3D model 1140 from the cloud server network 320. The viewing user terminal computer 1150 is configured to be a mobile terminal computer, such as a tablet and/or mobile phone and the viewing application 1160 is a virtual reality software application. An exemplary user interface of the viewing application 1160 in accordance with the invention is illustrated in the embodiments 95 and 98 of FIG. 12 and FIG. 15, respectively. Based on a virtual location of the viewing user within the end 3D model 1140, only the parts of the end 3D model 1140 visible from the virtual location are displayed on the viewing user terminal computer 1150. The cloud server network 320 detects the virtual location of the viewing user from the viewing user terminal computer 1150 using conventional detection techniques such as, mouse or keyboard control movements, gesture recognition techniques, facial recognition systems, 3D immersive touch user interface, etc.

Any features of embodiment 94 may be readily combined or permuted with any of the other embodiments 10, 11, 20, 30, 40, 50, 60, 70, 80, 91, 92, 93, 95, 96, 97, 98, 99A, and/or 99B in accordance with the invention.

Figure 12:
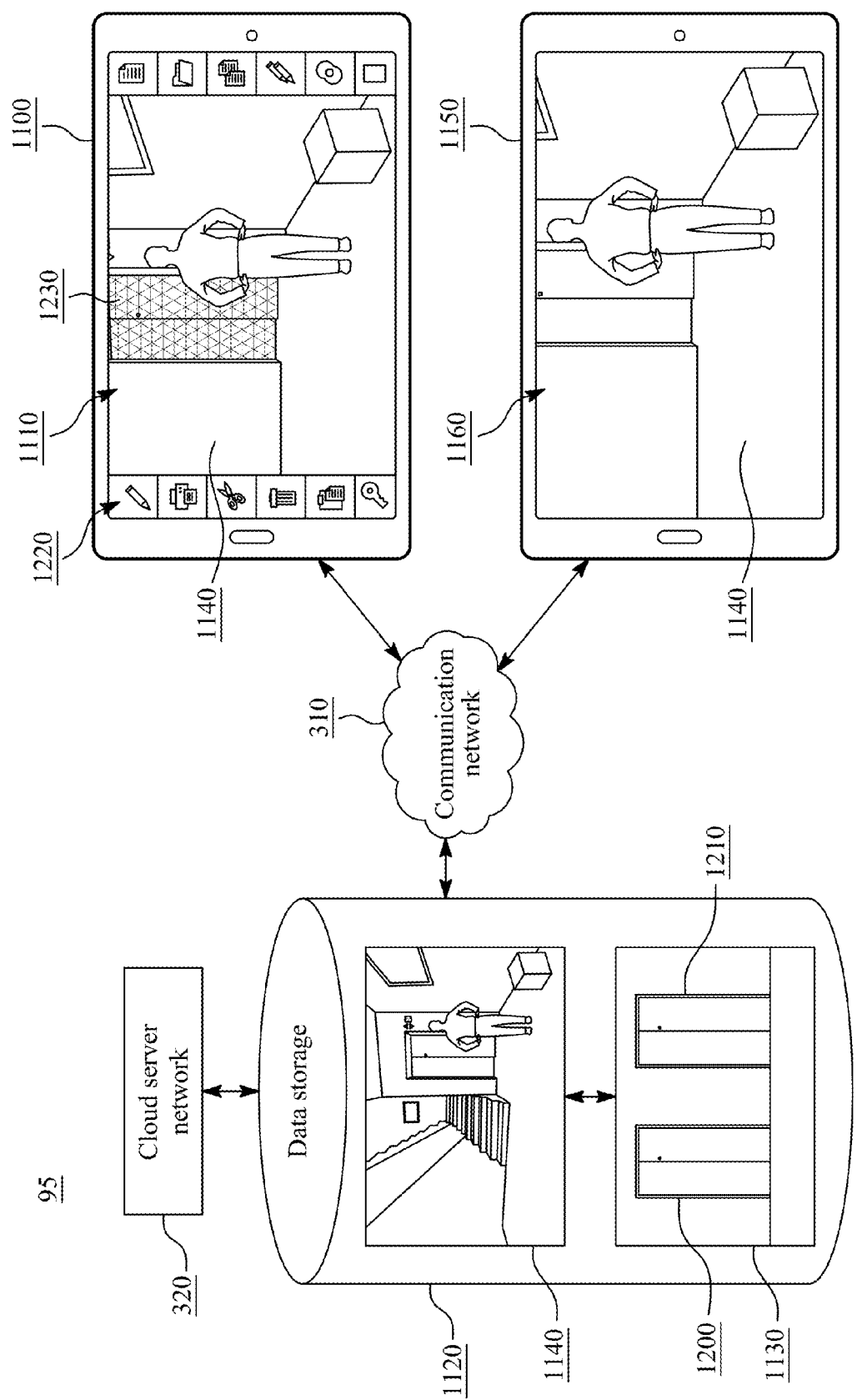
FIG. 12 demonstrates an embodiment 95 of more elaborate software program product user interface displaying compilation and presentation of the 3D model, in accordance with the invention as a screen shot diagram.

FIG. 12 demonstrates an embodiment 95 of more elaborate software program product user interface displaying compilation and presentation of the 3D model 1140, in accordance with the invention as a screen shot diagram. This could be for example the screen of a tablet or a smartphone. The cloud network server system 200 behind the user interface could be e.g. embodiment 94 explained with respect to FIG. 11.

The software program product is stored on a non-transient memory medium on at least one of the cloud server network 320, the drawing user terminal computer 1100, and/or the viewing user terminal computer 1150. The software program product may also be distributed between the cloud server network 320, the drawing user terminal computer 1100, and/or the viewing user terminal computer 1150, so that some parts of the software program product reside on the cloud server network 320, some parts of the software program product reside on the drawing user terminal computer 1100, and some parts of the software program product reside on the viewing user terminal computer 1150.

The software program product is operable with the cloud server network 320, the drawing user terminal computer 1100, and/or the viewing user terminal computer 1150, and also via the communication network 310. Typically, the drawing user terminal computer 1100 and the viewing user terminal computer 1150 are configured to have respective applications 1110 and 1160 installed that allow the drawing user and the viewing user to access the end 3D model 1140 from the cloud server network 320. The application user interfaces could be the user interfaces of the aforementioned applications 1110 and 1160. In an example, the applications 1110 and 1160 may be configured as virtual reality software applications that may provide touch sensitive interfaces for allowing the drawing user and the viewing user to access the 3D model 1140.

Consider an example of compiling and presenting the end 3D model 1140 of a 3D computer game. The cloud server network 320 composes the end 3D model 1140 of the 3D game using the pre-existing 3D models 1130 stored in the data storage 1120. A 3D scene of the 3D game comprises an elevator area and a staircase area adjacent to the elevator area. The cloud server network 320 uses pre-existing models 1200 and 1210 of the elevator area from the data storage 1120 to compose the end 3D model 1140 comprising the elevator area. The composed end 3D model 1140 is stored in the data storage 1120.

A designer developing the 3D game accesses the end 3D model 1140 from the cloud server network 320 via the drawing user terminal computer 1100. The drawing application 1110 provides multiple tools 1220 to the designer for compiling the end 3D model 1140. The cloud server network 320 detects a virtual location of the designer within the end 3D model 1140 as standing in the elevator area and streams only the parts of the 3D model 1140 corresponding to the elevator area. The 3D model 1140 is presented along with additional non-spatial information such as a sound in the elevator lobby to the designer. The designer may edit the 3D model 1140 via the drawing application 1110 using the desired designer tools 1220. The designer uploads the edited 3D model 1140 on the cloud server network 320 via the communication network 310. In an example, the cloud server network 320 may store different versions of the end 3D model 1140 uploaded by different designers using different drawing user terminal computers 1100 on the data storage 1120.

When a gamer (viewer) accesses the 3D game via the viewing application 1160 installed in the viewing user terminal computer 1150, the cloud server network 320 detects a virtual location of the viewing user by using a detection technique, such as, mouse or keyboard and/or a conventional gesture recognition technique. The cloud server network 320 streams the parts of the 3D game to the viewing user terminal computer 1150 based on the virtual location of the viewing user within the 3D game, for example, in the parts from in front of the elevator.

Any features of embodiment 95 may be readily combined or permuted with any of the other embodiments 10, 11, 20, 30, 40, 50, 60, 70, 80, 91, 92, 93, 94, 96, 97, 98, 99A, and/or 99B in accordance with the invention.

Figure 13:
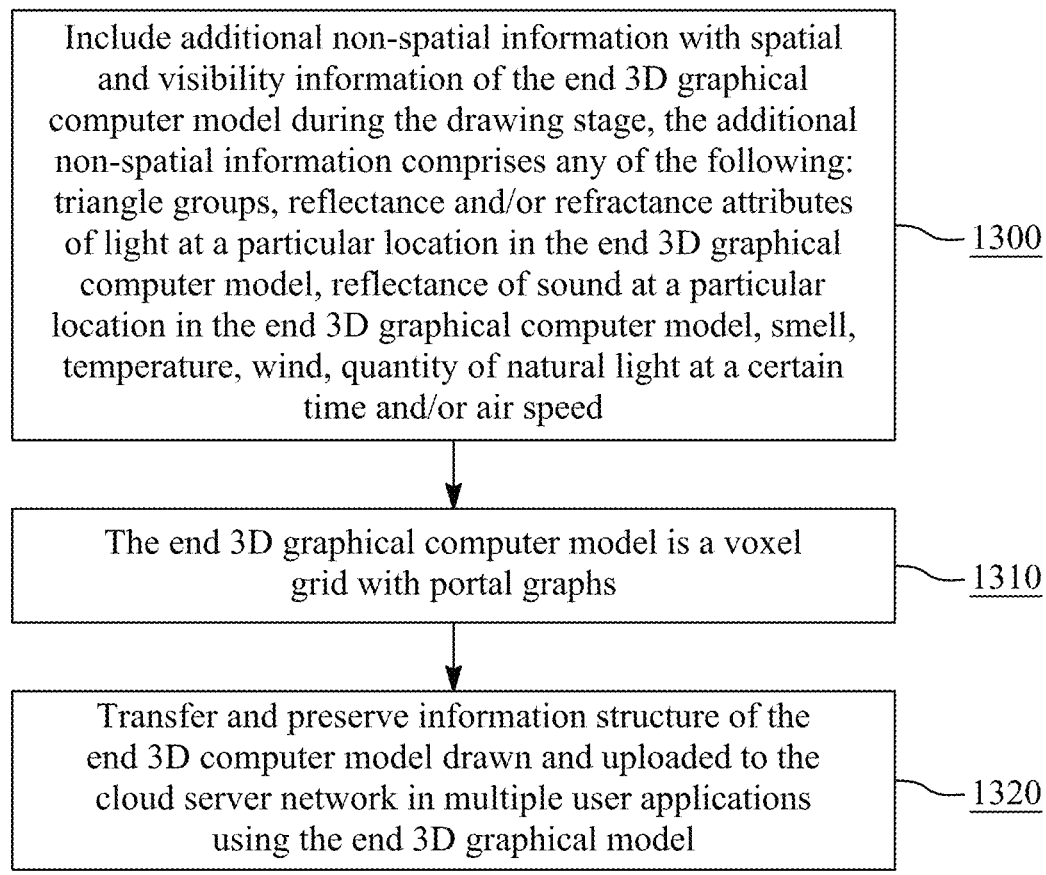
FIG. 13 demonstrates another embodiment 96 of the method of compiling and presenting the 3D model, in accordance with the invention as a flow diagram.

FIG. 13 demonstrates another embodiment 96 of the method of compiling and presenting the 3D model, in accordance with the invention as a flow diagram. The method could be implemented in a system identical or similar to embodiment 97 in FIG. 14 for example, as discussed in the other parts of the description. An end-user of the method could use a user interface identical or similar to that disclosed with embodiments 95 and 98 in FIG. 12 and FIG. 15, respectively.

In phase 1300, during the drawing stage of the end 3D model additional non-spatial information are included with the spatial and visibility information of the end 3D model. The additional non-spatial information included with the spatial information of the end 3D model comprises, for example, triangle groups, reflectance and/or refractance attributes of light at a particular location in the three-dimensional model, reflectance of sound at a particular location in the three-dimensional model, smell, temperature, wind, quantity of natural light at a certain time, air speed, etc.

In phase 1310, the end 3D model is configured as a voxel grid comprising portal graphs. The end 3D model comprising both the spatial information and the non-spatial information is converted into the voxel grid. An example implementation of the voxel grid is illustrated and explained in the detail with reference to FIG. 1(A), FIG. 9(A) and FIG. 9(B).

In phase 1320, information structure, or parts of it, of the end 3D model in the model drawn and uploaded to the cloud server network 320 is transferred to and preserved in multiple different user applications 1110 and 1160 using the end 3D model. In some embodiments, the information structure of the end 3D model may be transferred to and preserved in the drawing application 1110 installed in the drawing user terminal computer 1100, so that the drawing user (or designer) does not have to connect to the cloud server network 320 for accessing the end 3D model. In some other embodiments, the information structure of the end 3D model may be transferred to and preserved in the viewing application 1160 of the viewing user terminal computer 1150, so that the viewing user does not have to connect to the cloud server network 320 for accessing the end 3D model for viewing. The storage of the end 3D model in the terminal computers 1100 and 1150 allows saving time and improving user experience when data communication speed is limited.

Any features of embodiment 96 may be readily combined or permuted with any of the other embodiments 10, 11, 20, 30, 40, 50, 60, 70, 80, 91, 92, 93, 94, 95, 97, 98, 99A, and/or 99B in accordance with the invention.

Figure 14:
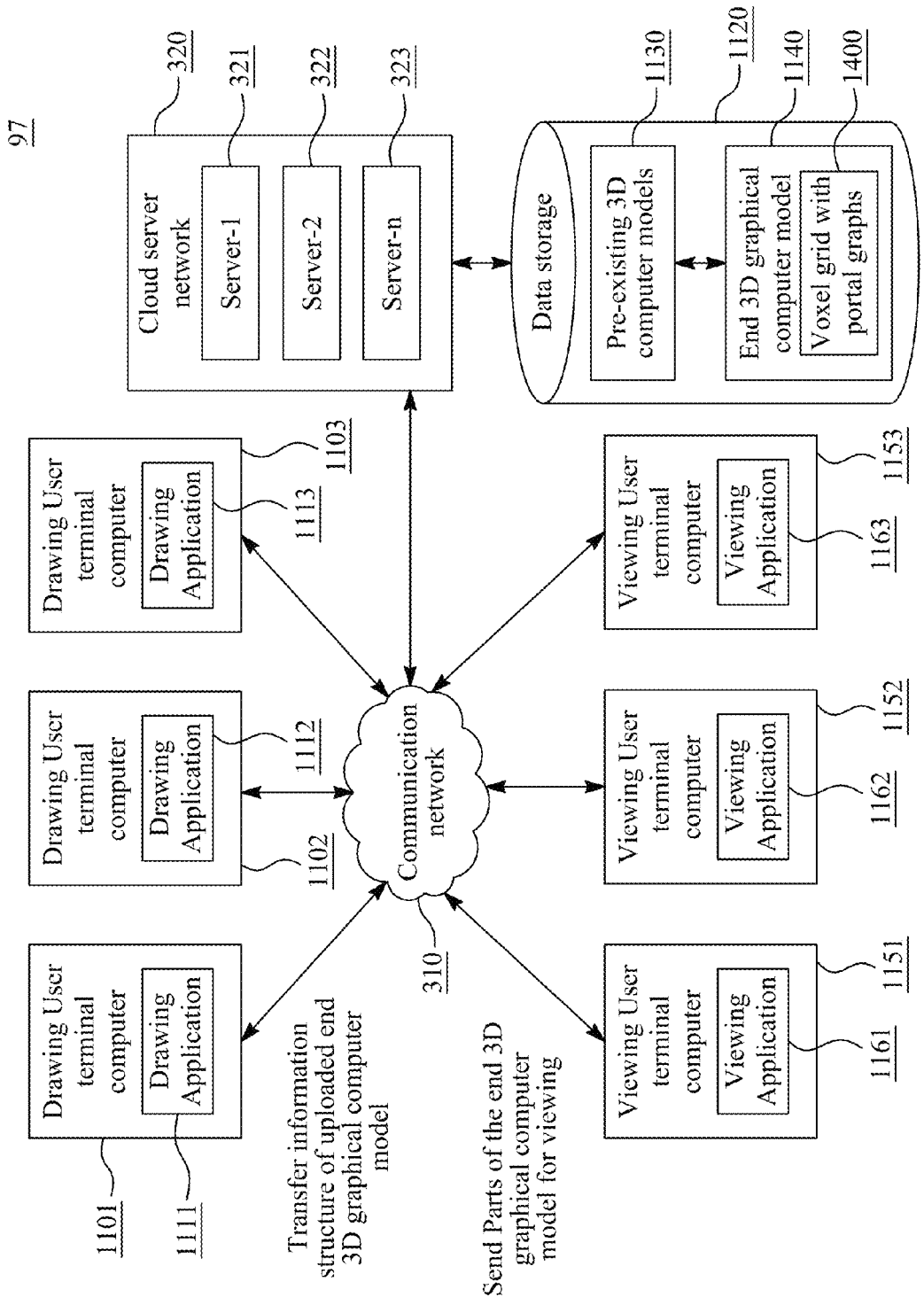
FIG. 14 demonstrates another embodiment 97 of a more elaborate cloud network server system for compiling and presenting the 3D model, in accordance with the invention as a block diagram.

FIG. 14 demonstrates another embodiment 97 of a more elaborate cloud network server system 200 for compiling and presenting the 3D model 1140, in accordance with the invention as a block diagram.

The cloud network server system 200 comprises the cloud server network 320, plurality of drawing user terminal computers 1101, 1102, and 1103, and plurality of viewing user terminal computers 1151, 1152, and 1153 communicating with each other via the communication network 310. The cloud network server system 200 comprises the data storage 1120 configured to store different pre-existing 3D models 1130 and end 3D models 1140 drawn and uploaded by the drawing user terminal computers 1101, 1102, and 1103.

The cloud server network 320 is used to compose the end 3D models 1140 from the pre-existing 3D models 1130 stored in the data storage 1120. The cloud server network 320 configures each end 3D models 1140 as a voxel grid with portal graphs 1400. The end 3D models 1140 configured as voxel grids 1400 are stored in the data storage 1120. The cloud server network 320 transmits the pre-existing 3D models 1130 and/or end 3D models 1140 to the drawing user terminal computers 1101, 1102, and 1103 via the communication network 310. The drawing users may access the end 3D models 1140 via the drawing applications 1111, 1112, and 1113 installed in respective drawing user terminal computers 1101, 1102, and 1103 for viewing and drawing on the pre-existing or end 3D models 1140. The cloud server network 320 includes additional non-spatial information with the spatial and visibility information of the end 3D models 1140 during the drawing stage. The additional non-spatial information comprises, for example, triangle groups, reflectance and/or refractance attributes of light, air speed, sound, smell etc.

The drawing user terminal computers 1101, 1102, and 1103 view the end 3D models 1140 along with the spatial and the non-spatial information. The drawing user terminal computers 1101, 1102, and 1103 update the end 3D models 1140, and upload the updated end 3D models 1140 on the cloud server network 320. The uploaded end 3D models 1140 are stored in the data storage 1120.

The cloud server network 320 transfers to and preserves the information structure of the end 3D models 1140 in different user applications (drawing applications) 1111, 1112, and 1113 of the drawing user terminal computers 1101, 1102, and 1103 and/or different user applications (viewing applications) 1161, 1162, and 1163 of the viewing user terminal computers 1151, 1152, and 1153 that are using the end 3D models 1140. The cloud server network 320 sends parts of the end 3D model 1140 to the viewing user terminal computers 1151, 1152, and 1153 based on a virtual location of each viewing user within the end 3D model 1140. The cloud server network 320 may detect the virtual location or changes thereof of each viewing user using conventional detection techniques such as, keyboard, mouse, 3D immersive touch user interface, gesture recognition techniques, facial recognition systems, etc.

Any features of embodiment 97 may be readily combined or permuted with any of the other embodiments 10, 11, 20, 30, 40, 50, 60, 70, 80, 91, 92, 93, 94, 95, 96, 98, 99A, and/or 99B in accordance with the invention.

Figure 15:
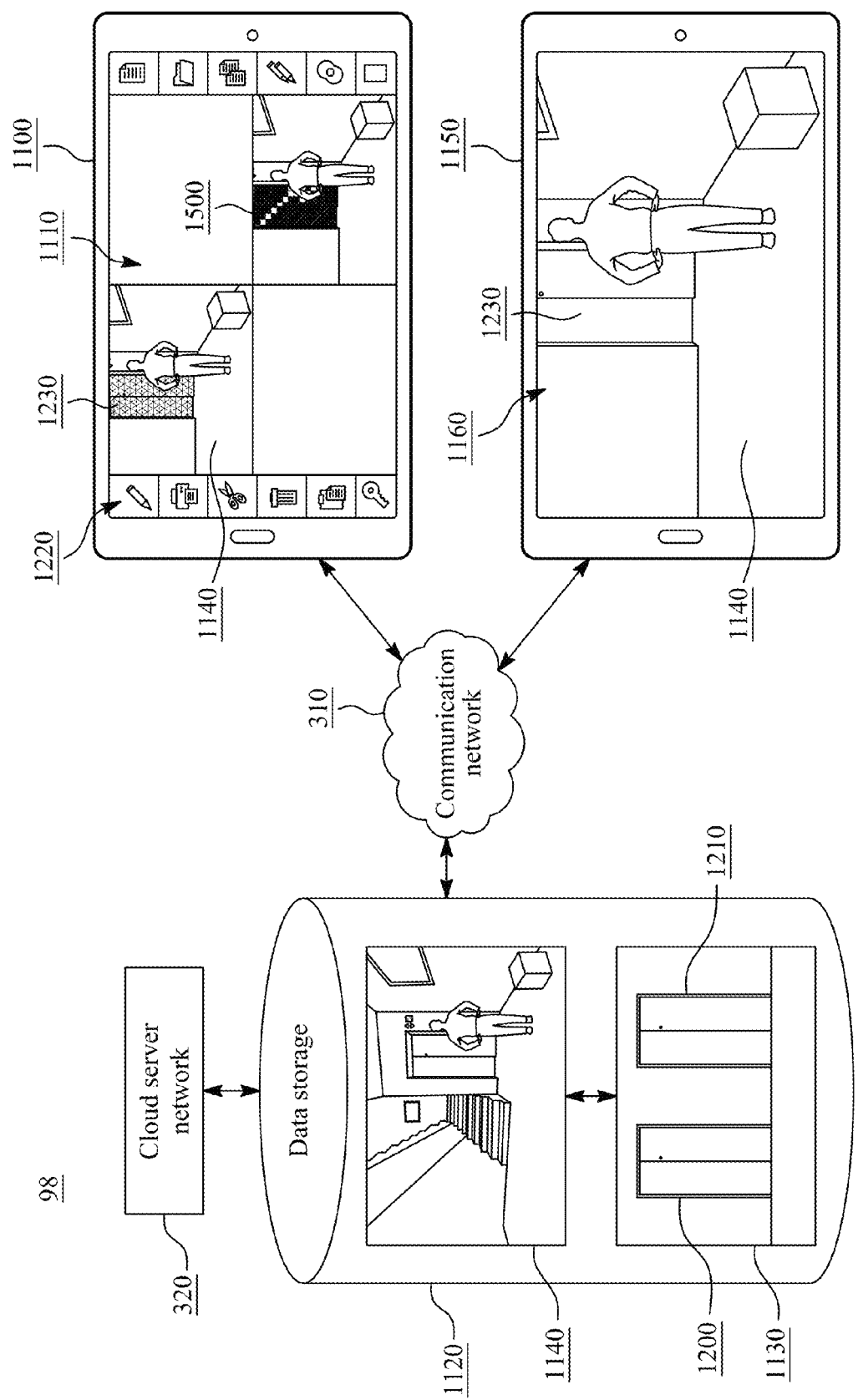
FIG. 15 demonstrates another embodiment 98 of more elaborate software program product user interface displaying compilation and presentation of the 3D model, in accordance with the invention as a screen shot diagram.

FIG. 15 demonstrates another embodiment 98 of more elaborate software program product user interface displaying compilation and presentation of the 3D model 1140, in accordance with the invention as a screen shot diagram.

Consider an example where a designer is building an architectural 3D model 1140 of a building. The designer decides to start designing an elevator area of the building. The cloud server network 320 has an end 3D model 1140 of the building composed from pre-existing 3D models 1130 stored in the data storage 1120. For example, an elevator door is composed from pre-existing models 1200 and 1210 of the elevator door stored in the data storage 1120. The cloud server network 320 detects the virtual position of the designer within the end 3D model 1140 to be at the elevator area. The cloud server network 320 streams the parts of the end 3D model 1140 associated with the elevator area to the drawing user terminal computer 1101, 1102, and 1103 or viewing user terminal computer 1151, 1152 and/or 1153. The 3D model 1140 of the elevator area is presented with non-spatial information such as, a voxel grid 1500 or a coded smell. By a coded smell we mean a code that instructs e.g. an odour emitter to emit an odour. The designer can choose any version of the 3D model 1140 of the elevator area, and remodel the selected version using the designing tools 1220 provided in the drawing application 1110. The edited version of the 3D model 1140 is uploaded to the cloud server network 320 via the communication network 310.

An architect working on the building may access the end 3D model 1140 via the viewing application 1160 installed in the viewing user terminal computer 1150. The cloud server network 320 detects the virtual position of the architect to be the elevator area via mouse tracking techniques, and streams the end 3D model 1140 corresponding to the elevator area to the viewing application 1160. The cloud server network 320 may render the 3D model 1140 with non-spatial information such as a door opening sound, reflection of light at the elevator area, etc.

In the aforementioned embodiments it is possible that in some embodiments non-visible features of the end 3D model 1140 are not even streamed to the terminal computer 1100 or 1150 along with not being drawn and presented on the application 1110 or 1160 of the terminal computer 1100 or 1150. Further, in the aforementioned embodiments the level of detail of the data is so managed, that the distance from which a virtual viewing user observes the 3D model features makes a significant difference and is taken into account. For example in some embodiments, the 3D model 1140 is built and displayed based on a viewing distance of the viewing user so that the 3D model 1140 has data just enough to satisfy the desired display resolution at the viewing distance.

Even further, in the aforementioned embodiments, the cloud network server system 200 knows which parts of the 3D model 1140 will be visible when the viewing user moves, for example, 10 meters into any direction without passing through walls. The cloud network server system 200 can thus consequently stream the features of the 3D model 1140 visible from the virtual location of the viewing user to the viewing user terminal computer 1150 at high priority. This restricted streaming of the parts of the 3D model 1140 has the advantage that, for example when the 3D model 1140 involves a large office building, the cloud network server system 200 may not stream any features of a building floor below the virtual location of the viewing user, if it is known that the shortest route to the floor below will involve a route more than 10 meters. There is no point in streaming the parts of the floor below, as the features of the 3D model 1140 within 10 meters on the same floor should be streamed first in accordance with the invention, because the user must traverse them first.

The combination of the aforementioned visibility management, level of detail management, and intelligent streaming allows for a powerful virtual user experience, even when data communication speed and data storage resources may be limited in the terminal computers 1100 or 1150 or in the cloud server network 320 in accordance with the invention.

Any features of embodiment 98 may be readily combined or permuted with any of the other embodiments 10, 11, 20, 30, 40, 50, 60, 70, 80, 91, 92, 93, 94, 95, 96, 97, 99A, and/or 99B in accordance with the invention.

Figure 16A:
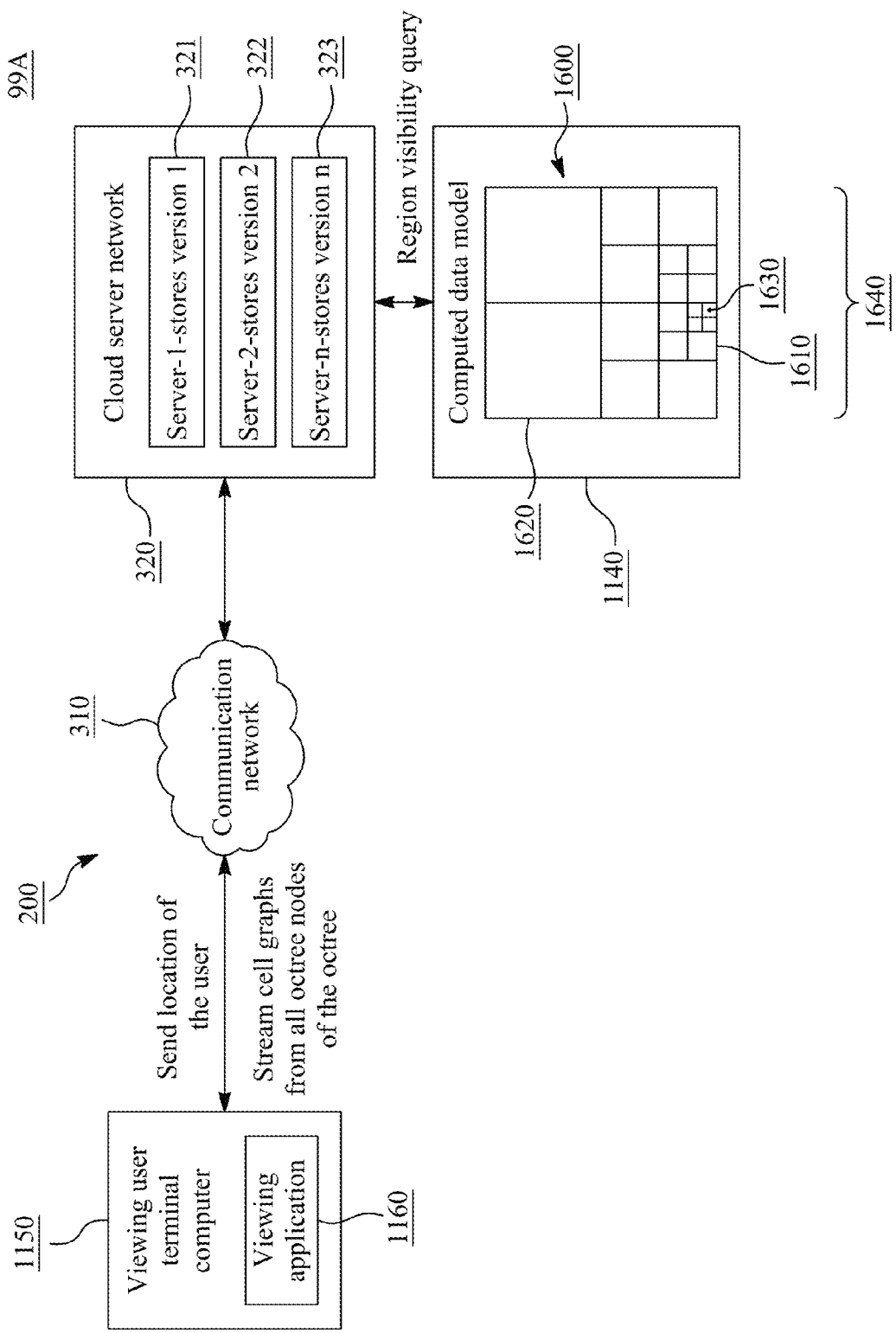
FIG. 16(A) shows an inventive octree data structure embodiment 99A useful in virtual reality streaming as a block diagram.

FIG. 16(A) shows a data structure embodiment 99A useful in virtual reality streaming, in accordance with the invention. The computed data model 1140 is spatially subdivided into an octree data structure 1600. Both inner nodes 1610 and leaf nodes 1620 contain a cell-and-portal graph, or simply cell graph. Additional data, such as geometry, textures and precomputed light transportation are bound to this cell graph. The higher the node (e.g., 1620) is in the tree, the bigger region it fills in space, but the computation parameters have been adjusted so to have less detail (e.g., the voxel size is bigger). Preferably in the end, all nodes 1610 and 1620 require approximately the same amount of memory and rendering power, despite that they cover different amount of volume in space.

In the runtime when the location 1630 of the user is known, an active set of nodes 1640 in the octree 1600 (a cut) is selected, so that the scene is covered with one node. The selected nodes 1640 are chosen so that they increase in size when the volume is further from the camera. This comes naturally by selecting nodes 1640, so that projected screen-space area of a voxel is approximately the same in all nodes 1610 and 1620.

When streaming data in to the user device memory (e.g., of the viewing user terminal computer 1150) from the cloud 320, typically almost all cell graphs from all octree nodes (e.g., 1610 and 1620) are streamed, because these do not consume much memory. These cell graphs are used to determine visible and soon-visible sets of objects that need to be streamed in. The determination is done by doing a region visibility query from the user location 1630 with some radius in the cell graph, which is used to determine what will be visible, for example, in a two-meter radius from the user location 1630.

For example, the visibility query determines from the cell graph which objects are visible in 2 meter distance and these would be streamed in. Cell graph traversal traverses the octree data structure 1600, which chooses that at this distance, the system 200 would pick objects that have been optimized, for example, for viewing distances of 1.5 meters to 3.0 meters. Generally, when the distance doubles, the objects are computed with twice as large voxels, but the object also covers more area. For example, at the distance 2 meters the system 200 could use 200 triangles for a teapot, and at the distance 4 meters the inventive system 200 could use only 100 triangles. At 8 meters this would be 50 triangles, and so forth.

Typically, a cloud server network 320, such as Amazon or the like, stores cell graphs and objects and cell graph links to these objects. At the beginning of the program runtime cell graphs are streamed in, which are used to find the required objects and soon-to-be-visible objects. Objects that are visible are streamed in first, and region visibility query is used to prioritize streaming in objects that are visible, for example in a 2 meter radius.

Any features of embodiment 99A may be readily combined or permuted with any of the other embodiments 10, 11, 20, 30, 40, 50, 60, 70, 80, 91, 92, 93, 94, 95, 96, 97, 98, and/or 99B in accordance with the invention.

Figure 16B:
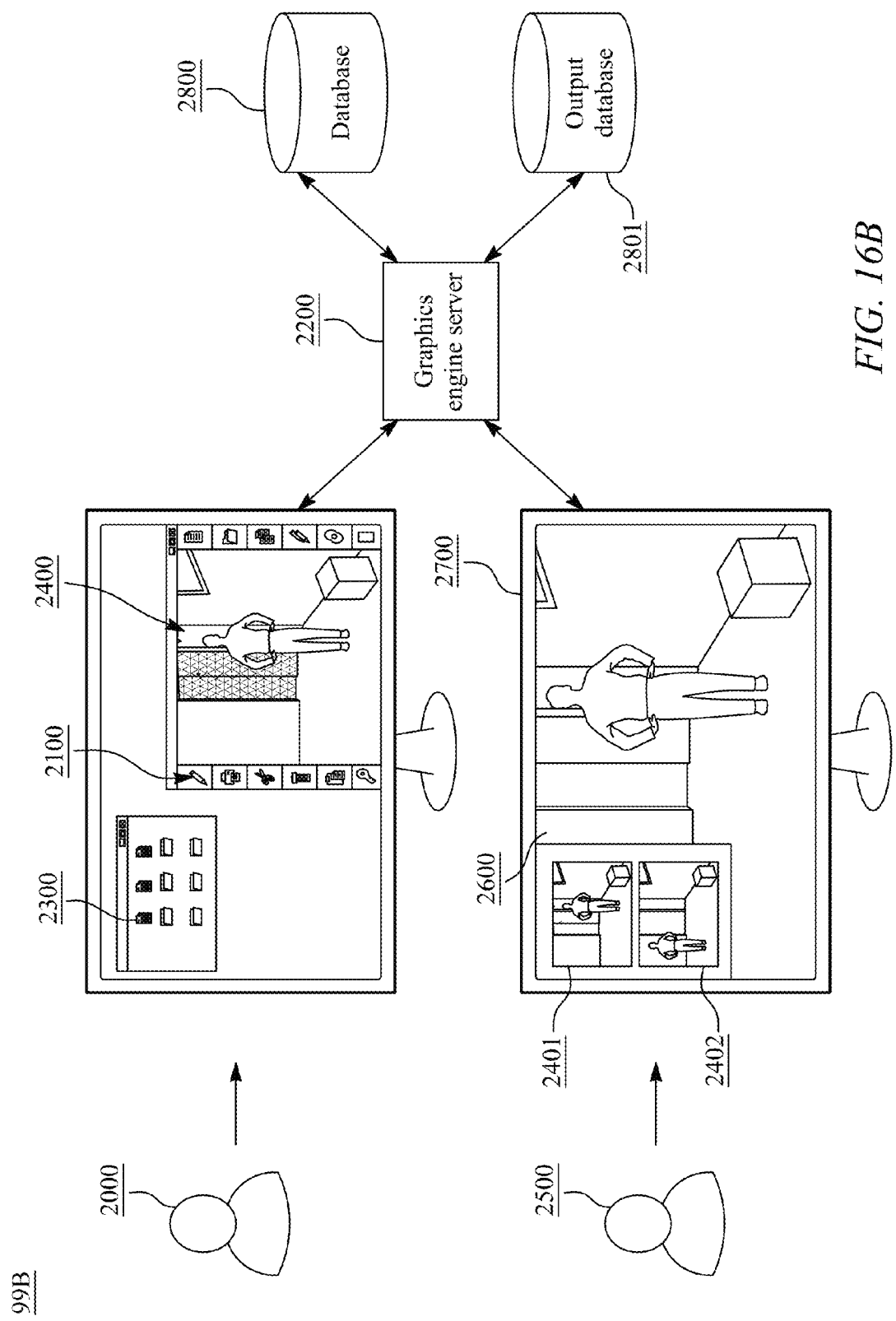
FIG. 16(B) shows an embodiment 99B of a user drawing into the cloud based computer 3D model to create a revised computer 3D model.

FIG. 16(B) shows a very practical embodiment 99B of the working of the invention. An editing user 2000 is using a CAD tool 2100, for example Revit, the Autodesk computer assisted design tool, which is integrated with the graphics engine server 2200 of the invention. The editing user 2000 typically opens the Revit CAD tool 2100, loads his design file 2300, and then logs into the graphics engine server 2200 from the Revit CAD tool 2100 integration. Subsequently, the graphics engine-CAD tool 2100 integration uploads a CAD scene 2400, e.g., a Revit 3D scene to the graphics engine server 2200. When the editing user 2000 makes further modifications to the Revit 3D scene 2400, the graphics engine—CAD tool integration 2100 uploads the modifications made by the editing user 2000 to the graphics engine server 2200.

When a viewing user 2500 views the 3D computer model, the viewing user 2500 starts a viewer application 2600 on his viewing device 2700. The viewing device 2700 can be any 3D device, i.e. it may be any of the following:
i. A VR (Virtual Reality) device,
ii. An AR (Augmented Reality) device,
iii. A desktop/laptop computer,
iv. Any device with a web browser, and/or
v. A mobile phone/a tablet.

The viewing user 2500 logs into the graphics engine server 2200 from the viewer application 2600. Then, the viewing user 2500 gets a list of active scenes 2400, 2401, 2402 on the graphics engine server 2200. The viewing user 2500 selects a scene from the list (e.g., the Revit scene 2400 being edited). The viewer application 2600 starts streaming data from the graphics engine server 2200. The streaming order is prioritized based on a user location in the 3D scene 2400, for example using visibility and distance, i.e. objects that are visible and close are given the highest priority. Subsequently in some embodiments of the invention the streamed data is decompressed, and said streamed data is cached on the local device (the viewing device 2700).

Then, the viewer application 2600 asks from the graphics engine server 2200 a version of data that has been optimized for the viewing device 2700 the viewer application 2600 is running on based on any of the following: a data format (for example, a texture and a mesh format), a data resolution (a texture size), data complexity (number of triangles and vertices), and data contents such as any of the following: triangle meshes, textures with multiple material channels including lighting and/or cell graphs.

The streamed 3D data is rendered in real-time on the viewing device 2700 for example, by using visibility data from the cell graph to determine what needs to be rendered on screen. When the viewing user 2500 changes location in the 3D scene 2400, new data is streamed and rendered based on the new location.

In some embodiments, the viewer application 2600 predicts the viewing user's 2500 movement and pre-caches data that is likely to be needed soon. When data changes on the graphics engine server 2200, the graphics engine server 2200 notifies the viewer application 2600 of the change, and the viewer application 2600 streams the updated data.

On the graphics engine server 2200, any of the following activities take place in the practical embodiment 99B, preferably together and sequentially:
  Uploaded input data from the editing user 2000 is stored into a database 2800,
  3D graphics data is created as a view from the database 2800,
  Bounding volumes of the database 2800 are computed,
  Bounding volume is split into a 3D spatial subdivision tree,
  For each node of the tree, the graphics data is computed,
  3D input data for the node is fetched from the database 2800,
  3D graphics data is voxelized,
  At least one cell graph is created,
  3D mesh reconstruction is created by any of the following:
1. Iso-surface extraction
2. Mesh decimation
3. Texture UV generation
4. Material sampling
  Lighting is computed,
  Resulting 3D mesh and texture are compressed,
  Output data is stored and cached into an output database 2801.

When the editing user 2000 updates the input data, then at the graphics engine server 2200, the nodes affected by the bounding volume of the changes are re-computed.

When the viewing user 2500 requests data from the graphics engine server 2200, any of the following activities take place, preferably together and sequentially:
  Active tree nodes are determined based on the viewing user's 2500 location in the 3D space,
  Output data corresponding to active tree nodes are sent to the viewing user 2500 according to any of the following:
i. Active tree nodes are determined by visibility determination and distance to the 3D location of the viewing user's 2500,
ii. Hidden meshes and textures determined by visibility data are not streamed to the viewing user 2500, and/or
iii. Data that has already been sent and cached to the viewing user 2500 earlier is not resent.

Preferably, the viewing user 2500 can request data in different output formats. If the requested format is not yet computed and cached in the output database 2801 it will be recomputed on demand before it is sent to the viewing user 2500.

Any features of embodiment 99B may be readily combined or permuted with any of the other embodiments 10, 11, 20, 30, 40, 50, 60, 70, 80, 91, 92, 93, 94, 95, 96, 97, 98, and/or 99A in accordance with the invention.

The invention has been explained in the aforementioned and sizable advantages of the invention have been demonstrated. The invention results in a more detailed virtual reality experience of 3D representation of a variety of scenes comprising a variety of objects, thereby providing an improved experience to the user. By incorporating the non-spatial data, such as, smell, sound reflection, light reflection and/or refraction, to a 3D model, the rendering of the 3D model provides a more seamless and interactive virtual reality experience to users. Also importantly, the present disclosure provides a method of creating different versions of the 3D model for different configurations of computer terminals. The invention takes into consideration bandwidth requirements, processing power, and/or memory requirements of the computer terminals. This is helpful in ensuring small memory footprint for displaying the 3D models along with the non-spatial characteristics in different types of computer terminals. Since the memory requirement is substantially reduced, the rendering of the 3D models becomes more time efficient. The invention results in a more lifelike virtual reality experience.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

U.S. Pat. No. 8,988,431 B2 CONSERVATIVE CELL AND PORTAL GRAPH GENERATION, published on Mar. 24, 2015 Makinen et al.
U.S. Pat. No. 9,245,064 B2 SECURELY SHARING DESIGN RENDERINGS OVER A NETWORK, published on Jan. 26, 2016 Barrie A. Loberg.
WO 2014159285 A1 SYSTEM AND METHOD FOR GENERATION OF SHADOW EFFECTS IN THREE-DIMENSIONAL GRAPHICS, published on Oct. 2, 2014 Ren et al.

The invention claimed is:

1. A method for experiencing a three-dimensional graphical computer model using at least one distributed cloud network server system comprising a plurality of servers at least one model upload computer and at least one user terminal computer thee method comprising:
uploading the three-dimensional graphical computer model comprising spatial and visibility information data to a cloud network from the at least one model upload computer, the three-dimensional graphical computer model being composed from the spatial and visibility information data and partitioned into smaller cells;
based on a virtual location of a user within the three-dimensional graphical computer model, displaying only parts of the three-dimensional graphical computer model that are visible from the virtual location on a terminal computer screen to the user, after the user connects to the cloud network with the at least one user terminal computer installed with an application configured for viewing the three-dimensional graphical computer model from said cloud server network; and streaming parts of the three-dimensional graphical computer model to the application on said at least one user terminal computer, wherein the three-dimensional graphical computer model is configured into a tree data structure that is queried with a visibility query with a radius from the virtual user location, the radius is limited to first visible objects from the virtual user location.

2. The method as claimed in claim 1, wherein additional non-spatial information is included with the spatial and visibility information of the three-dimensional model.

3. The method as claimed in claim 2, wherein said additional non-spatial information included with the spatial information of the three-dimensional model comprises any of the following: reflectance and/or refractance attributes of light at a particular location in the three-dimensional model, reflectance of sound at a particular location in the three-dimensional model, smell, temperature, wind, and quantity of natural light at a certain time and/or air speed.

4. The method as claimed in claim 3, wherein said streaming prioritizes a cell the user is currently in, or cells that are visible from the cell that the user is currently in, or are near the cell the user is currently in.

5. The method as claimed in claim 4, wherein the complexity of the model is adjusted based on available streaming bandwidth to the at least one user terminal computer and/or memory and/or processing power of said at least one user terminal computer.

6. The method as claimed in claim 5, wherein a plurality of different versions of different sizes are created from the three-dimensional graphical computer model for different bandwidth, memory and/or processing power environments.

7. The method as claimed in claim 6, wherein the plurality of different versions of the three-dimensional model is hosted in the cloud network server system.

8. The method as claimed in claim 1, wherein the cells are connected by portals that appear as doors or corridors in the three-dimensional model, and/or
the three-dimensional graphical computer model is a voxel grid with portal graphs.

9. The method as claimed in claim 1, wherein the user terminal computer is a mobile terminal computer, and the viewing application is a virtual reality software application.

10. The method as claimed in claim 1, wherein the information structure of the three-dimensional graphical computer model in the model upload computer and the cloud network are transferred to and preserved in multiple different user applications using said three-dimensional graphical model.

11. A software program product stored in a non-transitory computer-readable medium for providing a three-dimensional graphical computer model executable in at least one distributed cloud network server system comprising a plurality of servers, at least one model upload computer, and at least one user terminal computer, the software program product causing a processor to execute a method comprising:
uploading the three-dimensional graphical computer model comprising spatial and visibility information data to a cloud network from the at least one model upload computer, the three-dimensional graphical computer mode being composed from the spatial and visibility information data and partitioned into smaller cells;
based on a virtual location of a user within the three-dimensional graphical computer model, displaying only parts of the three-dimensional graphical computer model that are visible from the virtual location on a terminal computer screen to the user, after the user connects to the cloud network with the at least one user terminal computer installed with an application configured for viewing the three-dimensional graphical computer model from said cloud server network;

streaming parts of the three-dimensional graphical computer model and associated nonspatial information to the application said at least one user terminal computer, wherein the three-dimensional graphical computer model is configured into a tree data structure that is queried with a visibility query with a radius from the virtual user location, the radius is limited to first visible objects from the virtual user location.

12. The software program as claimed in claim 11, wherein additional non-spatial information is included with the spatial and visibility information of the three-dimensional model.

13. The software program as claimed in claim 12, said additional non-spatial information included with the spatial information of the three-dimensional model comprises any of the following: reflectance and/or refractance attributes of light at a particular location in the three-dimensional model, reflectance of sound at a particular location in the three-dimensional model, smell, temperature, wind, and quantity of natural light at a certain time and/or air speed.

14. The software program as claimed in claim 13, wherein said streaming prioritizes a cell the user is currently in, or cells that are visible from the cell that the user is currently in, or are near the cell the user is currently in.

15. The software program as claimed in claim 14, wherein the complexity of the model is adjusted based on available streaming bandwidth to the at least one user terminal computer and/or memory and/or processing power of said at least one terminal computer.

16. The software program as claimed in claim 15, wherein a plurality of different versions of different sizes are created from the three-dimensional graphical computer model for different bandwidth, memory and/or processing power environments.

17. The software program as claimed in claim 16, wherein the plurality of different versions of the three-dimensional model is hosted in the cloud network server system.

18. The software program as claimed in claim 11, wherein the cells are connected by portals that appear as doors or corridors in the three-dimensional model, and/or
the three-dimensional graphical computer model is a voxel grid with portal graphs.

19. The software program program as claimed in claim 11, wherein the user terminal computer is a mobile terminal computer, and the viewing application is a virtual reality software application.

20. The software program program as claimed in claim 11, wherein the information structure of the three-dimensional graphical computer model in the model upload computer and the cloud network are transferred to and preserved in multiple different user applications using said three-dimensional graphical computer model.

21. A cloud server network system provide a three-dimensional graphical computer comprising:
a plurality of servers;
at least one model upload computer configured to upload a three-dimensional graphical computer model comprising spatial and visibility information data to a cloud network, the three-dimensional graphical computer model being composed from the data and partitioned into smaller cells; and at least one user terminal, installed with an application configured for viewing the three-dimensional graphical computer model from the cloud server network, configured to enable a user to connect to the cloud network, the at least one user terminal displaying, based on a virtual location of the user within the three-dimensional graphical computer model, only parts of the three-dimensional graphical computer model visible from said virtual location on a terminal computer screen to the user, parts of the three-dimensional graphical computer model and associated non-spatial information being streamed to the application on said terminal computer, wherein the three-dimensional graphical computer model is configured into a tree data structure that is queried with a visibility query with a radius from the virtual user location, the radius is limited to first visible objects from the virtual user location.

22. The cloud server network system as claimed in claim 21, wherein additional non-spatial information is included with the spatial and visibility information of the three-dimensional model.

23. The cloud server network system as claimed in claim 22, wherein said additional non-spatial information included with the spatial information of the three-dimensional model comprises any of the following: reflectance and/or refractance attributes of light at a particular location in the three-dimensional model, reflectance of sound at a particular location in the three-dimensional model, smell, temperature, wind, and quantity of natural light at a certain time and/or air speed.

24. The cloud server network system as claimed in claim 23, wherein said streaming prioritizes a cell the user is currently in, or cells that are visible from the cell that the user is currently in, or are near the cell the user is currently in.

25. The cloud server network system as claimed in claim 24, wherein the complexity of the model is adjusted based on available streaming bandwidth to the at least one user terminal computer (210) and/or memory and/or processing power of said at least one terminal computer.

26. The cloud server network system as claimed in claim 25, wherein a plurality of different versions of different sizes are configured to be created from the three-dimensional graphical computer model for different bandwidth, memory and/or processing power environments.

27. The cloud server network system as claimed in claim 26, wherein the plurality of different versions of the three-dimensional model is hosted in the cloud network server system.

28. The cloud server network system as claimed in claim 21, wherein the cells are configured to be connected by portals that appear as doors or corridors in the three-dimensional model, and/or
the three-dimensional graphical computer model is configured as a voxel grid with portal graphs.

29. The cloud server network system as claimed in claim 21, wherein the user terminal computer is configured to be a mobile terminal computer, and the viewing application is configured to be a virtual reality software application.

30. The cloud server network system as claimed in claim 21, wherein the information structure of the three-dimensional computer model in the model upload computer and the cloud network is configured to be transferred to and preserved in multiple different user applications using said three-dimensional graphical computer model.

* * * * *

UNITED STATES PATENT AND TRADEMARK OFFICE
CERTIFICATE OF CORRECTION

PATENT NO. : 9,779,479 B1  
APPLICATION NO. : 15/415158  
DATED : October 3, 2017  
INVENTOR(S) : Otso Makinen et al.

Page 1 of 1

It is certified that error appears in the above-identified patent and that said Letters Patent is hereby corrected as shown below:

On the Title Page

On Page 2, Column 1, Item (51), under "Int. Cl.", delete
"*G06T 19/00* (2011.01)  
*G09G 5/00* (2006.01)  
*G06T 15/08* (2011.01)  
*G06T 3/40* (2006.01)  
*G06T 19/20* (2011.01)" and  
insert -- *G06T 19/00* (2011.01)  
    *G09G 5/00* (2006.01)  
    *G06T 15/08* (2011.01) --, therefor.

In the Claims

In Column 25, Line 15, Claim 13, delete "12, said" and insert -- 12, wherein said --, therefor.

In Column 25, Line 45, Claim 19, delete "program program" and insert -- program --, therefor.

In Column 25, Line 49, Claim 20, delete "program program" and insert -- program --, therefor.

Signed and Sealed this  
Twenty-sixth Day of June, 2018

Andrei Iancu  
*Director of the United States Patent and Trademark Office*